US011917940B1

(12) United States Patent
Wright et al.

(10) Patent No.: US 11,917,940 B1
(45) Date of Patent: Mar. 5, 2024

(54) ELECTRIC LAWNMOWERS WITH COOLING FEATURES INTEGRATED INTO MOWING-UNIT ENCLOSURES AND METHODS OF OPERATING THEREOF

(71) Applicant: DIMAAG-AI, Inc., Fremont, CA (US)

(72) Inventors: Ian Wright, Woodside, CA (US); David Beard, Alameda, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/474,640

(22) Filed: Sep. 26, 2023

Related U.S. Application Data

(60) Provisional application No. 63/520,843, filed on Aug. 21, 2023.

(51) Int. Cl.
*A01D 34/82* (2006.01)
*A01D 34/66* (2006.01)
*A01D 34/78* (2006.01)
*A01D 34/81* (2006.01)
*A01D 69/02* (2006.01)
*A01D 101/00* (2006.01)

(52) U.S. Cl.
CPC .............. *A01D 34/82* (2013.01); *A01D 34/66* (2013.01); *A01D 34/78* (2013.01); *A01D 34/81* (2013.01); *A01D 69/02* (2013.01); *A01D 2101/00* (2013.01)

(58) Field of Classification Search
CPC ........ A01D 34/81; A01D 34/82; A01D 34/78; A01D 69/02
See application file for complete search history.

(56) References Cited

U.S. PATENT DOCUMENTS

| | | | |
|---|---|---|---|
| 7,690,176 B2 * | 4/2010 | Shinn ................... | A01G 23/00 56/11.9 |
| 8,191,343 B1 * | 6/2012 | Hauser ................. | A01D 69/02 56/11.9 |
| 9,301,443 B2 * | 4/2016 | Hashima .............. | B60W 30/18 |
| 9,888,626 B2 | 2/2018 | Gilpatrick et al. | |
| 11,382,264 B2 * | 7/2022 | Ito ........................ | A01D 34/81 |
| 2008/0099262 A1 * | 5/2008 | Phillips ............... | H01M 10/625 165/41 |
| 2014/0182257 A1 | 7/2014 | Rentzell | |

OTHER PUBLICATIONS

Wright, Ian, et al. "Electric Lawnmowers with Interchangeable Mowing Units and Methods of Operating Thereof", U.S. Appl. No. 18/474,646, filed Sep. 26, 2023.
Wright, Ian, et al. "Low-Noise Electric Lawnmowers with Curved Cutting Blades and Methods of Operating Thereof", U.S. Appl. No. 18/474,636, filed Sep. 26, 2023.

* cited by examiner

*Primary Examiner* — Alicia Torres
(74) *Attorney, Agent, or Firm* — Polygon IP, LLP

(57) ABSTRACT

Electric lawnmowers comprise mowing-unit decks with fluid passages used for cooling batteries, power electronics units, and/or drive motors. Specifically, a lawnmower comprises a drive unit (with a battery, power electronics, and one or more drive motors) and a mowing unit (with a mowing-unit deck). The deck's fluid passage is fluidically coupled to the drive unit (e.g., the motor and power electronics). The thermal liquid is heated by the drive unit's components and cooled as the liquid passes through the deck's fluid passage. The mowing unit may be equipped with a pump (for circulating this liquid), which can be powered by an electric motor on the mowing unit. The same motor may be used for rotating the cutting blades. The drive unit may have an additional cooling circuit providing immersion cooling to the batteries.

20 Claims, 20 Drawing Sheets

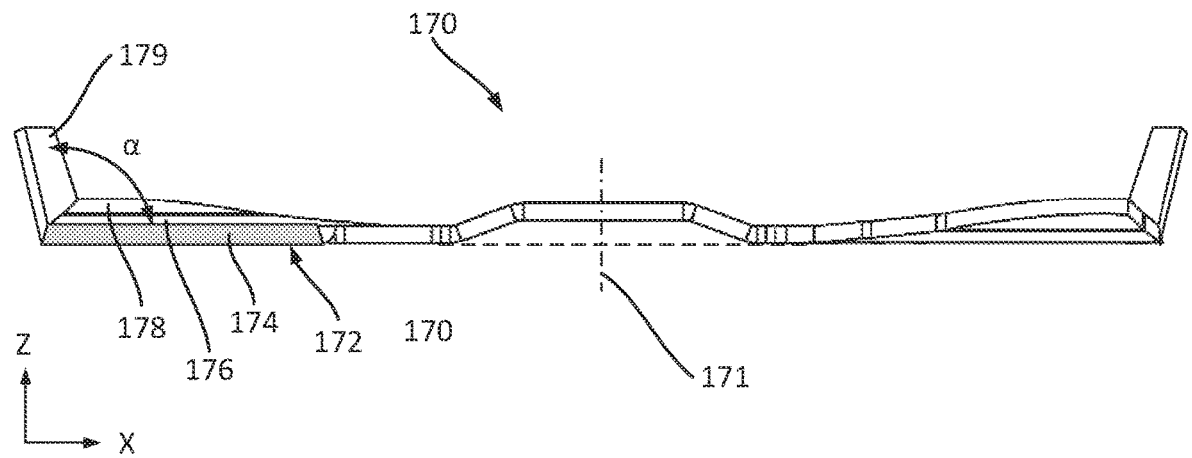
FIG. 5
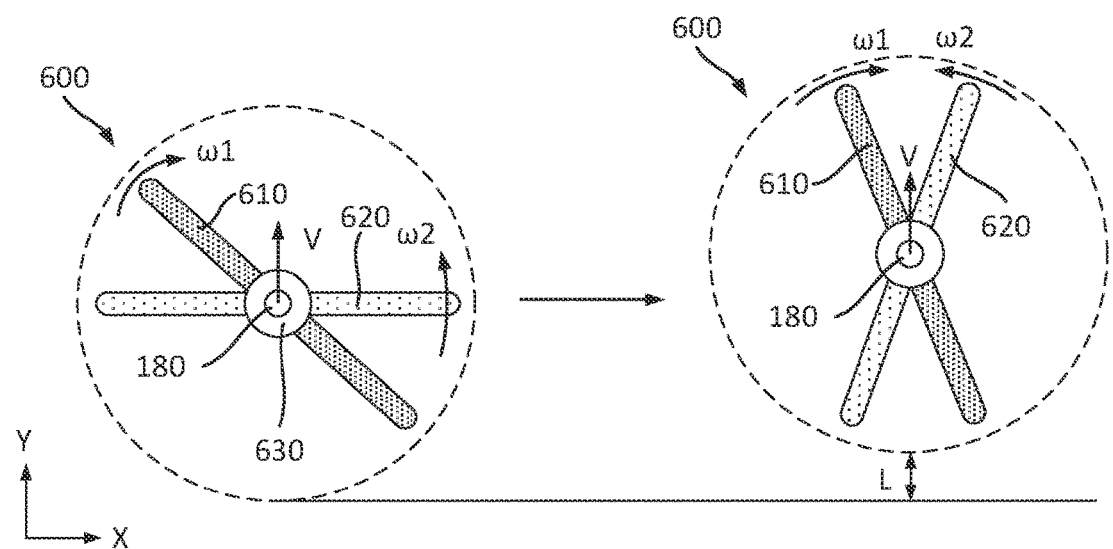
FIG. 6A  FIG. 6B

ELECTRIC LAWNMOWERS WITH COOLING FEATURES INTEGRATED INTO MOWING-UNIT ENCLOSURES AND METHODS OF OPERATING THEREOF

CROSS-REFERENCE TO RELATED APPLICATIONS

This application claims the benefit under 35 U.S.C. § 119(e) of U.S. Provisional Patent Application 63/520,843 filed on 2023, Aug. 21 which is incorporated herein by reference in its entirety for all purposes.

BACKGROUND

Lawnmowers are used to cut grass to a uniform height and include unpowered mowers (e.g., push reel mowers), internal combustion engine (ICE)-powered mowers, and electric mowers. Currently, ICE-powered mowers are predominantly used. Integrating batteries and electric motors into lawnmowers (especially, large-size mowers such as riding mowers and zero-turn mowers) proved to be challenging due to the operating environment (e.g., dust, debris) and the need to maintain low mower costs (e.g., relative to passenger electric vehicles which can be sold at much higher price points). At the same time, electric mowers have various advantages over gasoline-powered mowers such as no harmful exhausts, quieter operations, and potential modularity/ability to change mowing units. However, these advantages require significant changes to various other mower features, such as cutting blades, cooling systems, location/connectivity of various components, and the like.

For example, conventional ICE-powered lawnmowers can be quite noisy during their operation, e.g., produce 90 to 95 DBA at 10 meters. One reason for such noise levels is the use of ICE engines, which are inherently noisy. The other reasons are high cutting blade speeds (e.g., 4000 RPM) and blade shapes, which can create significant turbulence within the blade enclosure (also known as a mower deck). As such, the operation of such ICE-powered lawnmowers may require hearing protection and may not be possible during certain hours (e.g., morning, or late night). On the other hand, electric motors produce much lower noise levels. However, other components (e.g., cutting blades) need to be redesigned to match the noise levels of the electric motors to take greater advantage of the overall noise reduction. In other words, using electric motors with conventional blades at conventional blade speeds still produces high noise levels due to the turbulence produced by these blades.

Furthermore, switching to electric motors and battery power introduces new cooling changes, e.g., cooling power electronics, batteries, and/or electric motors. Some of these challenges come from operating environment and conditions. For example, an electric mower can be operated at a maximum power output for prolonged periods (e.g., a couple of hours) while producing heat at its battery, power electronics unit, and various electric motors. Liquid cooling can be used for these components. However, the coolant needs to be pumped and cooled, which complicates the mower design and increases its costs. Furthermore, the operating environment can make this cooling challenging.

What is needed are new electric lawnmowers that can provide quieter operations, advanced cooling options, and/or interchangeability of mowing units.

SUMMARY

Described herein are low-noise electric lawnmowers comprising curved cutting blades and methods of operating thereof. In some examples, a lawnmower comprises a driving unit and a mowing unit with a mowing-unit deck. The mowing-unit deck comprises a set of blade units (e.g., 3 units) and a discharge conduit. Each blade unit comprises a blade enclosure and a cutting blade with a cutting edge having a curved shape. For example, the cutting edge, at a point furthest away from the blade center axis, may form an approach angle of 20°-60°. This curving aspect allows operating the blade at lower rotating speeds (e.g., less than 3,000 RPM), which reduces the turbulence and noise. In some examples, the blade enclosure forms an enclosure tunnel defining a tunnel inlet and a tunnel outlet such that the tunnel's cross-sectional area increases from the tunnel's inlet to the outlet.

Also described herein are electric lawnmowers comprising mowing-unit decks with fluid passages used for cooling batteries, power electronics units, and/or drive motors. Specifically, a lawnmower comprises a drive unit (with a battery, power electronics, and one or more drive motors) and a mowing unit (with a mowing-unit deck). The deck's fluid passage is fluidically coupled to the drive unit (e.g., the motor and power electronics). The thermal liquid is heated by the drive unit's components and cooled as the liquid passes through the deck's fluid passage. The mowing unit may be equipped with a pump (for circulating this liquid), which can be powered by an electric motor on the mowing unit. The same motor may be used for rotating the cutting blades. The drive unit may have an additional cooling circuit providing immersion cooling to the batteries.

Further described herein are electric lawnmowers comprising drive units and mowing units disengageably coupled to the drive units. For example, a drive unit can be disengageably coupled to any one of multiple mowing units (e.g., rotating mowing units, reel mowing units) collecting forming a mowing system. For example, each of the drive and mowing units may be equipped with corresponding mechanical-engagement structures that are configured to be disengageably coupled. Each mowing unit is equipped with its electric motor (e.g., for rotating the cutting blades or the reel of that unit). The electric motor may comprise an electric connector, which is disengageably coupled to the drive unit's electrical wiring. In some examples, each mowing unit can also form a liquid disengageable coupling for circulating a thermal liquid between the drive unit and mowing unit, e.g., for cooling various components of the drive unit.

Clause 1. An electric lawnmower comprising: a drive unit; and a mowing unit coupled to the drive unit and comprising a set of cutting blade units and a discharge conduit, mechanically attached to the set of cutting blade units, wherein: each of the set of cutting blade units comprises a blade enclosure and a cutting blade having a blade center axis, the blade enclosure forms an enclosure tunnel defining a tunnel inlet, a tunnel outlet, a tunnel center axis defined by a geometric center of a cross-sectional area of the enclosure tunnel and extending about the blade center axis between the tunnel inlet and the tunnel outlet, the enclosure tunnel is fluidically coupled to the discharge conduit at the tunnel inlet and the tunnel outlet, and the cross-sectional area of the enclosure tunnel increases from the tunnel inlet to the tunnel outlet.

Clause 2. The electric lawnmower of clause 1, wherein the cutting blade comprises a cutting edge having a curved shape.

Clause 3. The electric lawnmower of clause 2, wherein the cutting edge, at a point furthest away from the blade center axis, forms an approach angle ($\alpha$) of 20°-60°.

Clause 4. The electric lawnmower of clause 3, wherein the approach angle ($\alpha$) of the cutting edge is larger as the cutting edge extends closer to the blade center axis.

Clause 5. The electric lawnmower of clause 2, wherein the cutting edge has a curvature radius that varies.

Clause 6. The electric lawnmower of clause 5, wherein the curvature radius of the cutting edge is smaller as the cutting edge extends closer to the blade center axis.

Clause 7. The electric lawnmower of clause 2, wherein: the cutting blade comprises a cutting portion, a transition portion, and a lifting portion such that the cutting edge is a part of the cutting portion, the transition portion interconnects the lifting portion and the cutting portion, and both the transition portion and the lifting portion protrude away from a plane defined by the cutting portion.

Clause 8. The electric lawnmower of clause 7, wherein: the transition portion forms an angle of 5-15° relative to the plane defined by the cutting portion, and the lifting portion forms an angle of relative to the plane defined by the cutting portion.

Clause 9. The electric lawnmower of clause 1, wherein: the enclosure tunnel comprises a tunnel width and an average tunnel height, and the average tunnel height increases from the tunnel inlet to the tunnel outlet.

Clause 10. The electric lawnmower of clause 9, wherein the enclosure tunnel has a height that varies across the tunnel width.

Clause 11. The electric lawnmower of clause 1, wherein: the blade enclosure comprises an enclosure opening defined by a bottom edge of the blade enclosure and providing access for grass to the enclosure tunnel, and the tunnel center axis is not parallel to the enclosure opening.

Clause 12. The electric lawnmower of clause 11, wherein the enclosure opening is planar.

Clause 13. The electric lawnmower of clause 1, wherein the cross-sectional area of the enclosure tunnel gradually increases from the tunnel inlet to the tunnel outlet.

Clause 14. The electric lawnmower of clause 1, wherein the blade enclosure comprises a fluid passage extending within a wall of the blade enclosure and sealed from environment.

Clause 15. The electric lawnmower of clause 1, wherein the mowing unit comprises a mowing-unit electric motor driving the cutting blade in each of the set of cutting blade units.

Clause 16. The electric lawnmower of clause 1, wherein the electric lawnmower is a ride-on zero-turn lawnmower.

Clause 17. A method of operating an electric lawnmower, the method comprising: providing the electric lawnmower of a drive unit and a mowing unit coupled to the drive unit and comprising a set of cutting blade units and a discharge conduit, mechanically attached to the set of cutting blade units, wherein: each of the set of cutting blade units comprises a blade enclosure and a cutting blade having a blade center axis, the blade enclosure forms an enclosure tunnel defining a tunnel inlet, a tunnel outlet, a tunnel center axis defined by a geometric center of a cross-sectional area of the enclosure tunnel and extending about the blade center axis between the tunnel inlet and the tunnel outlet, the enclosure tunnel is fluidically coupled to the discharge conduit at the tunnel inlet and the tunnel outlet, and the cross-sectional area of the enclosure tunnel increases from the tunnel inlet to the tunnel outlet; and rotating the cutting blade at a speed of less than 3,000 RPMs.

Clause 18. The method of clause 17, wherein the electric lawnmower produces a noise level of less than 70 dB at 10 meters.

Clause 19. The method of clause 17, wherein rotating the cutting blade comprises slicing grass extending into the enclosure tunnel and carrying the sliced grass into the discharge conduit.

Clause 20. The method of clause 17, further comprising circulating a thermal liquid through a fluid passage of the blade enclosure.

Clause 21. An electric lawnmower comprising: a drive unit comprises a battery, a power electronics unit, and a drive motor powered by the battery; and a mowing unit coupled to the drive unit and comprising a set of cutting blade units, wherein: each unit in the set of cutting blade units comprises a blade enclosure and a cutting blade at least partially surrounded by the blade enclosure, and the blade enclosure comprises a fluid passage, fluidically connected to at least one of the battery, the power electronics unit, and the drive motor of the drive unit such that a thermal liquid is able to circulate between the fluid passage of each unit in the set of cutting blade units and the at least one of the battery, the power electronics unit, and the drive motor for cooling the at least one of the battery, the power electronics unit, and the drive motor.

Clause 22. The electric lawnmower of clause 21, wherein the fluid passage is a cavity formed within a wall of the blade enclosure.

Clause 23. The electric lawnmower of clause 22, wherein: the blade enclosure of each unit in the set of cutting blade units is monolithically integrated into a mowing-unit enclosure, and the mowing-unit enclosure is a single-cast unit with the fluid passage formed during casting of the mowing-unit enclosure.

Clause 24. The electric lawnmower of clause 23, the mowing-unit enclosure comprises a set of pressure-releasing plug distributed along the fluid passage of the blade enclosure in each unit in the set of cutting blade units and configured to open the fluid passage to environment when a pressure inside the fluid passage exceeds a set threshold.

Clause 25. The electric lawnmower of clause 23, wherein the mowing unit comprises a thermal-liquid pump, extending into the fluid passage of the blade enclosure of one unit in the set of cutting blade units and is mechanically coupled to and driven by a mowing-unit electric motor.

Clause 26. The electric lawnmower of clause 25, wherein: the mowing unit comprises a belt coupling the thermal-liquid pump and a shaft of each unit in the set of cutting blade units to the mowing-unit electric motor, and the shaft is connected to the cutting blade of a corresponding unit in the set of cutting blade units.

Clause 27. The electric lawnmower of clause 25, further comprising a temperature controller, configured to receive temperature of at least one of the battery, the power electronics unit, and the drive motor of the drive unit and further configured to operate the mowing-unit electric motor based on the temperature received from at least one of the battery, the power electronics unit, and the drive motor.

Clause 28. The electric lawnmower of clause 25, wherein the mowing-unit electric motor is powered by the battery.

Clause 29. The electric lawnmower of clause 25, wherein the thermal-liquid pump is configured to pump a thermal liquid through the fluid passage of the blade enclosure of each unit in the set of cutting blade units and though the least one of the battery, the power electronics unit, and the drive motor of the drive unit.

Clause 30. The electric lawnmower of clause 29, wherein: the power electronics unit comprises a heat exchanger comprising a first fluid passage and a second fluid passage that are thermally coupled to each other, the first fluid passage is fluidically coupled to the fluid passage of the blade enclosure of each unit in the set of cutting blade units and is filled with the thermal liquid, and the second fluid passage is fluidically coupled with the battery and is filled with an additional thermal liquid, different from the thermal liquid.

Clause 31. The electric lawnmower of clause 30, wherein: the thermal liquid is a water-based liquid, and the additional thermal liquid is an oil-based liquid.

Clause 32. The electric lawnmower of clause 30, wherein: the battery is an immersion-cooled battery comprising a set of bus bars interconnecting cell terminals, and the set of bus bars and the cell terminals of the battery are in direct contact with the additional thermal liquid.

Clause 33. The electric lawnmower of clause 29, wherein the drive unit comprises an additional thermal liquid pump for pumping the additional thermal liquid between the second fluid passage is fluidically coupled with the battery.

Clause 34. The electric lawnmower of clause 21, wherein: the mowing unit comprises a set of fluid couplers providing dis-engageable fluidic couplings to at least one of the battery and a drive motor of the drive unit, and the fluid passage is fluidically connected to the set of fluid couplers.

Clause 35. The electric lawnmower of clause 34, wherein each coupler in the set of fluid couplers is a no-spill coupler.

Clause 36. The electric lawnmower of clause 21, wherein the fluid passage is a pipe connected to an exterior surface of a wall of the blade enclosure.

Clause 37. A method of cooling one or more components of an electric lawnmower comprising a drive unit and a mowing unit, the method comprising: coupling the drive unit to the mowing unit, wherein: the drive unit comprises a battery, a power electronics unit, and a drive motor powered by the battery, the mowing unit comprises a set of cutting blade units such that each unit in the set of cutting blade units comprises a blade enclosure and a cutting blade at least partially surrounded by the blade enclosure, the blade enclosure comprises a fluid passage, which is fluidically connected to at least one of the battery, the power electronics unit, and the drive motor of the drive unit after coupling the drive unit to the mowing unit, and the mowing unit comprises a thermal-liquid pump, extending into the fluid passage of the blade enclosure of one unit in the set of cutting blade units and is mechanically coupled to a mowing-unit electric motor; and operating the mowing-unit electric motor thereby causing the cutting blade of each unit in the set of cutting blade units to spin and also causing the thermal-liquid pump to pump a thermal liquid through the fluid passage and between the fluid passage and at least one of the battery, the power electronics unit, and the drive motor of the drive unit.

Clause 38. The method of clause 37, wherein coupling the drive unit to the mowing unit comprises connecting a thermal liquid tubing of the drive unit to a set of fluid couplers of the mowing unit thereby forming a fluidic connection between the fluid passage and at least one of the battery, the power electronics unit, and the drive motor.

Clause 39. The method of clause 37, wherein coupling the drive unit to the mowing unit comprises electrically connecting the mowing-unit electric motor to the battery.

Clause 40. The method of clause 37, wherein: the power electronics unit comprises a heat exchanger comprising a first fluid passage and a second fluid passage thermally coupled to each other, the first fluid passage is fluidically coupled to the fluid passage of the blade enclosure of each unit in the set of cutting blade units such that the thermal liquid is pumped through the first fluid passage, the second fluid passage is fluidically coupled with the battery and is filled with an additional thermal liquid, different from the thermal liquid, and the method further comprises pumping the additional thermal liquid between the second fluid passage and the battery.

Clause 41. An electric lawnmower comprising: a drive unit comprises a power electronics unit, a battery, and a drive motor, powered by the battery; and a mowing unit that is disengageably coupled to the drive unit and comprising a mowing-unit electric motor and a set of cutting blade units, wherein: the mowing-unit electric motor comprises a set of electric connectors disengageably coupled to an electrical wiring to the battery of the drive unit, each unit in the set of cutting blade units comprises a blade enclosure, a shaft protruding through the blade enclosure, and a cutting blade connected to the shaft and at least partially surrounded by the blade enclosure, and the shaft of each unit in the set of cutting blade units is mechanically coupled to the mowing-unit electric motor.

Clause 42. The electric lawnmower of clause 41, wherein: the mowing unit comprises a set of fluid couplers disengageably coupled to a thermal liquid tubing of the drive unit, and the blade enclosure comprises a fluid passage, fluidically connected to the set of fluid couplers.

Clause 43. The electric lawnmower of clause 42, wherein the thermal liquid tubing is fluidically connected to at least one of the power electronics unit, the battery, and the drive motor of the drive unit.

Clause 44. The electric lawnmower of clause 42, wherein each coupler in the set of fluid couplers is a no-spill coupler.

Clause 45. The electric lawnmower of clause 42, wherein the mowing unit comprises a thermal-liquid pump, extending into the fluid passage of the blade enclosure of one unit in the set of cutting blade units and is mechanically coupled to the mowing-unit electric motor.

Clause 46. The electric lawnmower of clause 45, wherein the mowing unit comprises a belt coupling the thermal-liquid pump and the shaft of each unit in the set of cutting blade units to the mowing-unit electric motor.

Clause 47. The electric lawnmower of clause 45, wherein the fluid passage is a cavity formed within a wall of the blade enclosure.

Clause 48. The electric lawnmower of clause 45, wherein the thermal-liquid pump is configured to pump the thermal liquid through the fluid passage of the blade enclosure of all units in the set of cutting blade units and also through at least one of the power electronics unit, the battery, and the drive motor of the drive unit.

Clause 49. The electric lawnmower of clause 42, wherein the mowing-unit enclosure comprises a set of pressure-releasing plug distributed along the fluid passage of the blade enclosure in each unit in the set of cutting blade units and configured to open the fluid passage to environment when a pressure inside the fluid passage exceeds a set threshold.

Clause 50. The electric lawnmower of clause 42, wherein the fluid passage is a pipe connected to an exterior surface of a wall of the blade enclosure.

Clause 51. The electric lawnmower of clause 41, wherein: the blade enclosure of each unit in the set of cutting blade units is monolithically integrated into a mowing-unit enclosure, and the mowing-unit enclosure is a single-cast unit.

Clause 52. The electric lawnmower of clause 41, wherein the set of cutting blade units comprises three cutting blade units.

Clause 53. The electric lawnmower of clause 41, wherein: the mowing unit comprises a set of mowing-unit mechanical-engagement structures, and the drive unit comprises a set of drive-unit mechanical-engagement structures engaging the mowing-unit mechanical-engagement structures when the moving unit is connected to the drive unit.

Clause 54. The electric lawnmower of clause 53, wherein the set of mowing-unit mechanical-engagement structures protrude into a corresponding set of cavities of the mowing-unit mechanical-engagement structures when the moving unit is connected to the drive unit.

Clause 55. The electric lawnmower of clause 41, wherein the electric lawnmower is a zero-tur mower.

Clause 56. A method of replacing a mowing unit of an electric lawnmower with an additional mowing unit, the mowing unit comprising a drive unit, the method comprising: operating the electric lawnmower with the mowing unit connected to the drive unit; disconnecting an electric wiring of the drive unit from a mowing-unit electric motor of the mowing unit; disengaging a set of drive-unit mechanical-engagement structures of the drive unit from a set of mowing-unit mechanical-engagement structures of the mowing unit; positioning the mowing unit away from the drive unit aligning the additional mowing unit with the drive unit; engaging the set of drive-unit mechanical-engagement structures of the drive unit to a set of additional mowing-unit mechanical-engagement structures of the additional mowing unit; connecting the electric wiring of the drive unit to an additional mowing-unit electric motor of the additional mowing unit; and operating the electric lawnmower with the additional mowing unit attached to the drive unit.

Clause 57. The method of clause 56, wherein: the mowing unit is a rotary mowing unit, and the additional mowing unit is a reel mowing unit.

Clause 58. The method of clause 56, wherein the drive unit is a zero-turn mower.

Clause 59. The method of clause 56, further comprising: before disengaging the set of drive-unit mechanical-engagement structures from the set of mowing-unit mechanical-engagement structures of the mowing unit, disconnecting a thermal liquid tubing from a set of fluid couplers of the mowing unit; and after engaging the set of drive-unit mechanical-engagement structures to the set of additional mowing-unit mechanical-engagement structures of the additional mowing unit, connecting the thermal liquid tubing to additional dis-engageable fluidic couplings of the additional mowing unit.

Clause 60. The method of clause 58, wherein operating the electric lawnmower with the mowing unit connected to the drive unit comprises pumping a thermal liquid between the mowing unit connected to the drive unit.

BRIEF DESCRIPTION OF THE DRAWINGS

FIG. 5 is a schematic cross-sectional view of another example of a cutting blade comprising wingtips.

FIGS. 6A and 6B are schematic views of a rotary mowing unit illustrating two cutting blades rotating in opposite directions and creating a scissor-like effect, in accordance with some examples.

DETAILED DESCRIPTION

Figure 1A:
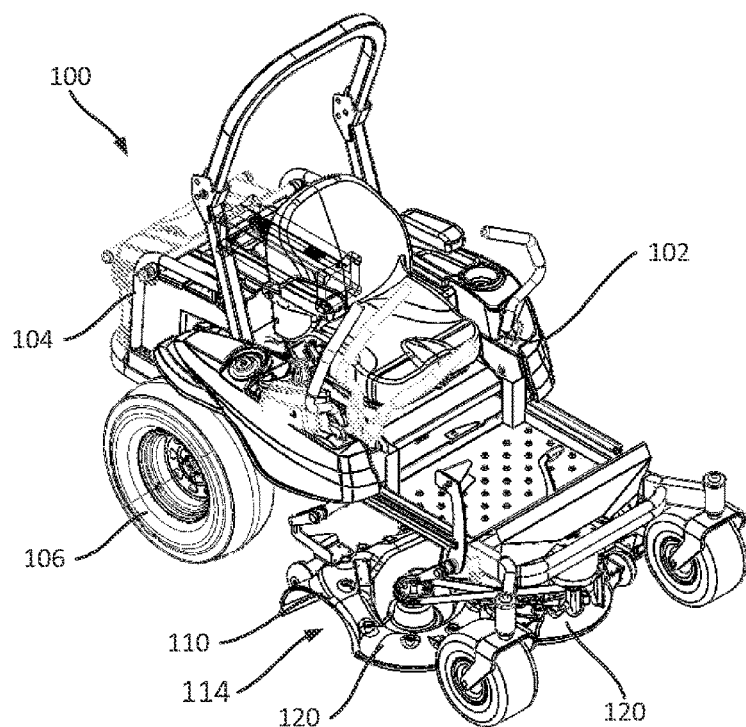
FIG. 1A is a schematic perspective view of an electric lawnmower (e.g., a zero-turn lawnmower), in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

It has been found that (1) using electric motors for lawnmowers, (2) reducing the blade speed, and (3) changing the blade and enclosure shape can significantly decrease the operating noise of the lawnmowers, e.g., to below 70 DBA at 10 meters. Not only hearing protection is not needed at such low noise levels but operators or people nearby can have conversations while the lawnmower is operating. Reducing the noise level is highly beneficial yet is not possible with conventional lawnmowers. Furthermore, focusing on only one of these features (e.g., switching from an internal combustion engine (ICE) to an electric motor) is not sufficient for the stated noise reduction. For example, switching to an electric motor reduces the motor noise but the blade noise (caused by turbulence) still remains. Simply reducing the blade speed (which uses conventional blades) may not be sufficient for efficient grass cutting and clearing grass clippings from the blade enclosures. For example, conventional blades use a straight cutting edge that minimizes the contact area between the blade and grass thereby requiring high blade speeds for efficient cutting. Furthermore, a significant contribution to the turbulence/noise level is provided by the blade enclosure.

As such, the speed reduction or, more specifically, such a significant speed reduction as proposed herein (e.g., from 4,000 RPM to 2,000 RPM) requires various novel blade and enclosure designs to achieve the efficient grass cutting and the removal of clippings from the enclosure. Specifically, the speed reduction generally (1) reduces the airflow through the enclosure and (2) reduces the speed at which the blade contacts the grass. Furthermore, a certain minimum airflow is needed to clear the cut grass from the blade enclosure. At the same time, the contact speed determines, at least in part, the cut quality. Both of these potential issues, associated with a lower blade speed, are addressed with various novel blade and enclosure features described below. As a reference, the overall grass-cutting process comprises the following stages: (1) lifting grass for cutting, (2) cutting grass, and (3) optionally, removing the grass through a discharge opening. In some examples, the grass is mulched by repeated cutting and dropped back on the lawn at the cutting location.

However, changing the cutting blade design such that the cutting blade has a cutting edge with a curved shape (vs. straight cutting edges of conventional lawnmower blades) helps to utilize a much more efficient slicing action (vs. conventional hitting action by the straight edges). The slicing action provides a larger contact area between the cutting edge and grass stems as further described below. As such, grass can still be cut at much lower rotational speeds of the blade while still providing efficient cutting. Furthermore, various additional features (e.g., lifting portions and "winglets" can be provided in the cutting blades) to further reduce turbulence.

Furthermore, changing the profile of a tunnel formed by the blade enclosure can help to remove grass clippings from this tunnel. For example, the tunnel may have an increasing cross-sectional area (e.g., due to the tunnel becoming taller and/or wider) in the direction of the blade rotation. This cross-sectional area increase reduces the restriction to air and glass clippings within the tunnel thereby more effectively moving these clippings to the tunnel exit.

Furthermore, switching to electric motors in lawnmowers provides a new opportunity for mowing-unit interchangeability and, in some examples, using mowing units for heat dissipation. For example, conventional ICE lawnmowers typically use a single motor to both (1) drive/move the mower and (2) rotate one or more cutting blades of the mowing unit. The power to the mowing unit can be transferred using mechanical or hydraulic coupling, both of which can be challenging to disconnect/reconnect. Electric motors tend to be more compact than ICE motors and require fewer utilities for their operations (e.g., electric power connections). As such, an electric lawnmower can use one or more electric motors to drive/move the mower (e.g., one motor per wheel such as an in-wheel/hub motor) and another motor positioned on a mowing unit for rotating one or more cutting blades. As such, only electrical coupling is needed between the drive unit and mowing unit to operate the mowing-unit motor thereby providing various interchangeability options. Specifically, different mowing units may have their own designated electric motors allowing using any one of these mowing units with the same drive unit, collectively forming an electric lawnmower system. Conventional mowers with integrated mower units require a separate drive unit for each type of mowing unit thereby creating unnecessary redundancies.

Furthermore, mowing units can be used for cooling various components of the electric lawnmower, such as a battery, power electronics, drive motor, and/or mowing-unit electric motor. The mowing unit or, more specifically, the mowing-unit enclosure can be used as a thermal mass and to form fluid passages for circulating the thermal liquid. Furthermore, the mowing unit can be equipped with a thermal-liquid pump, driven by a mowing-unit electric motor and configured to circulate the thermal liquid through the fluid passages in the mowing-unit enclosure as well as between the mowing unit and the drive unit (e.g., the power electronics and/or the drive motors of the drive unit).

Electric Lawnmower Examples

Figure 1B:
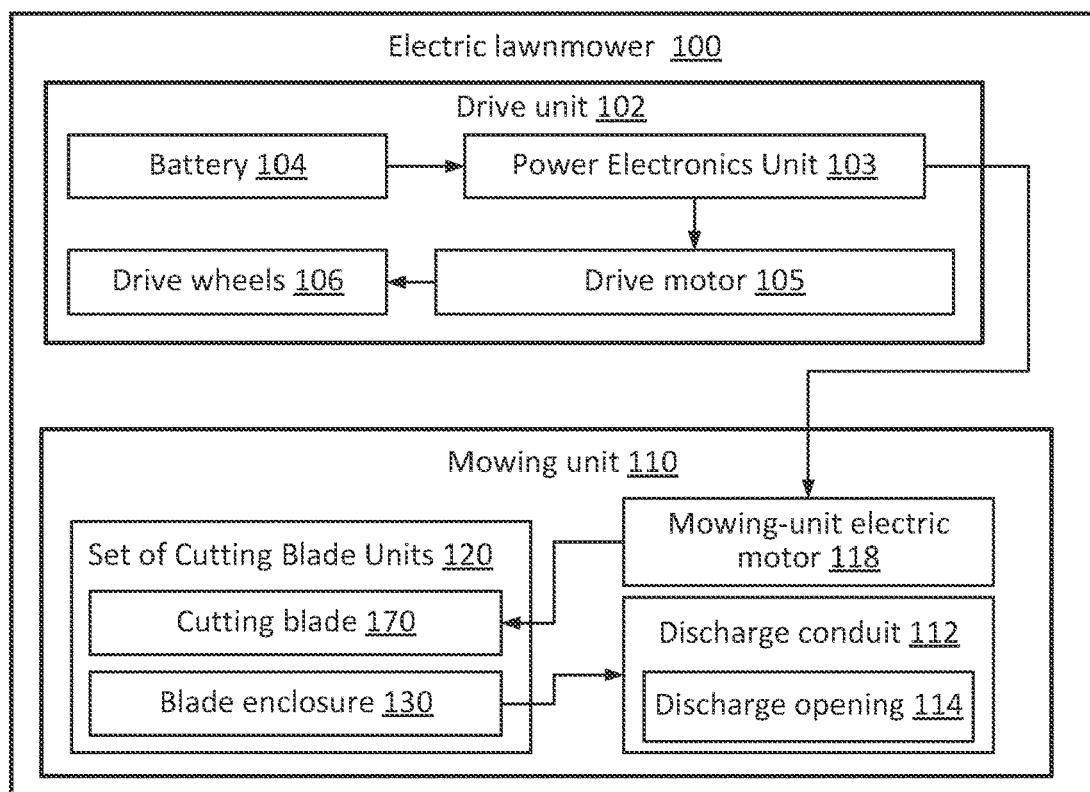
FIG. 1B is a block diagram of the electric lawnmower in FIG. 1A, illustrating various components of the electric lawnmower, in accordance with some examples.

FIG. 1A is a schematic perspective view of the electric lawnmower 100, in accordance with some examples. FIG. 1B is a block diagram of electric lawnmower 100 in FIG. 1A, illustrating various components of this electric lawnmower 100. Specifically, FIG. 1A illustrates an example of an electric lawnmower 100, which is a ride-on zero-turn lawnmower. However, other types of electric lawnmower 100 are also within the scope, e.g., push mowers (corded, cordless), riding mowers (with a steering wheel), tractor-mounted mowers, and the like.

Referring to FIGS. 1A and 1B, in some examples, electric lawnmower 100 comprises drive unit 102 and mowing unit 110 coupled to drive unit 102 or, more specifically, disengageably coupled to the drive unit 102 (as further described below with reference to FIGS. 10A-11F). The mowing unit 110 comprises a set of cutting blade units 120, which can be integrated into a mowing-unit enclosure 122. The mowing unit 110 can also comprise a mowing-unit electric motor 118 for rotating the cutting blades 170 of the mowing unit 110 and, in some examples, performing other functions (e.g., pumping the thermal liquid 902 through the mowing-unit enclosure 122). Depending on the type of the electric lawnmower 100, the drive unit 102 can comprise a battery 104, one or more drive motors 105, and drive wheels 106. Battery 104 can provide power to the drive motor 105 (that rotates wheels 106) as well as to mowing unit 110 or, more specifically, to the mowing-unit electric motor 118 of mowing unit 110. It should be noted that switching to electric motors (from ICEs used in conventional mowers) allows the decoupling of the power source for the wheels 106 and the power source for the mowing unit 110, i.e., by using multiple different electric motors, thereby providing various additional functionality not previously available on conventional mowers.

Figure 2A:
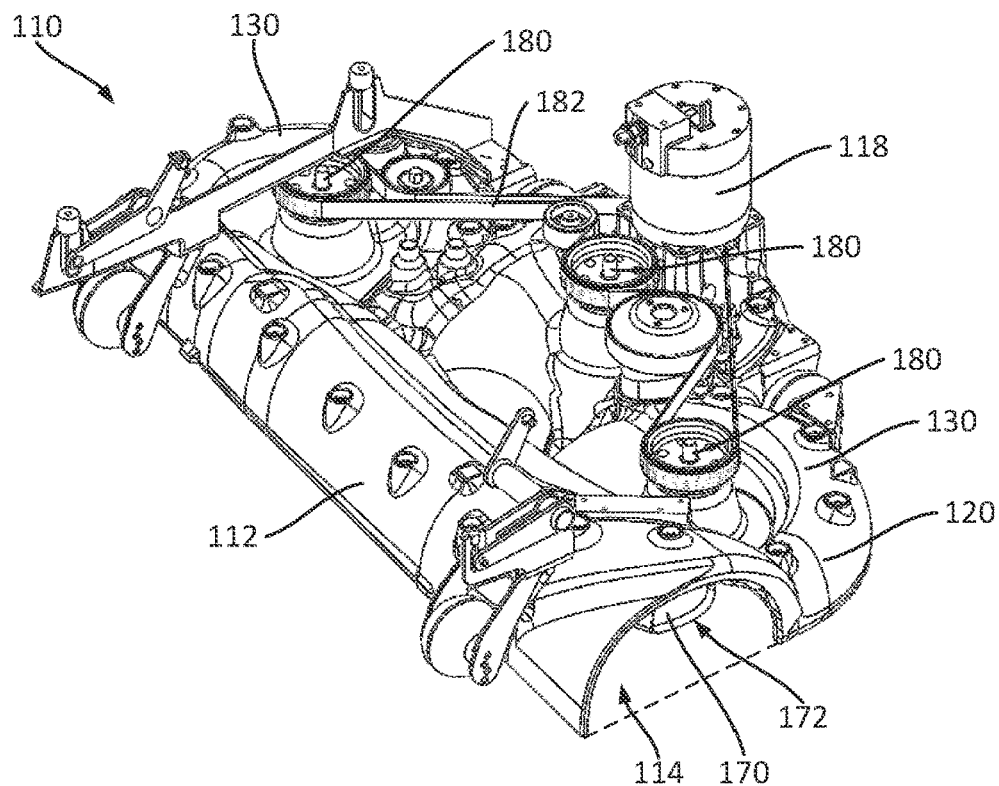
FIG. 2A is a schematic perspective view of the mowing unit of the electric lawnmower in FIG. 1B, in accordance with some examples.
Figure 2B:
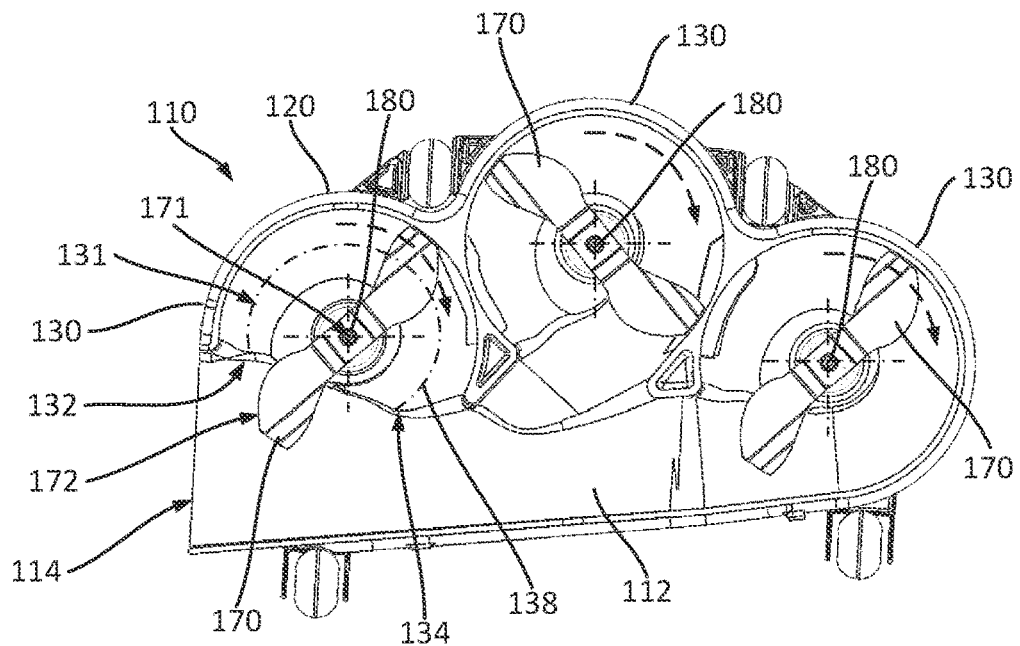
FIG. 2B is a schematic bottom view of the mowing unit of the electric lawnmower in FIG. 1B, in accordance with some examples.

Referring to FIGS. 1B, 2A, and 2B, in some examples, mowing unit 110 also comprises discharge conduit 112, mechanically attached to a set of cutting blade units 120 and comprising discharge opening 114. The discharge conduit 112 and the blade unit 120 can be integrated into a mowing-unit enclosure 122, which can be a single-cast unit. Each one of the cutting blade units 120 comprises a blade enclosure 130 and a cutting blade 170 having a blade center axis 171. While FIGS. 2A and 2B illustrates mowing unit 110 having three blade units, any number of blade units are within the scope (e.g., one, two, three, four, or more).

Figure 3A:
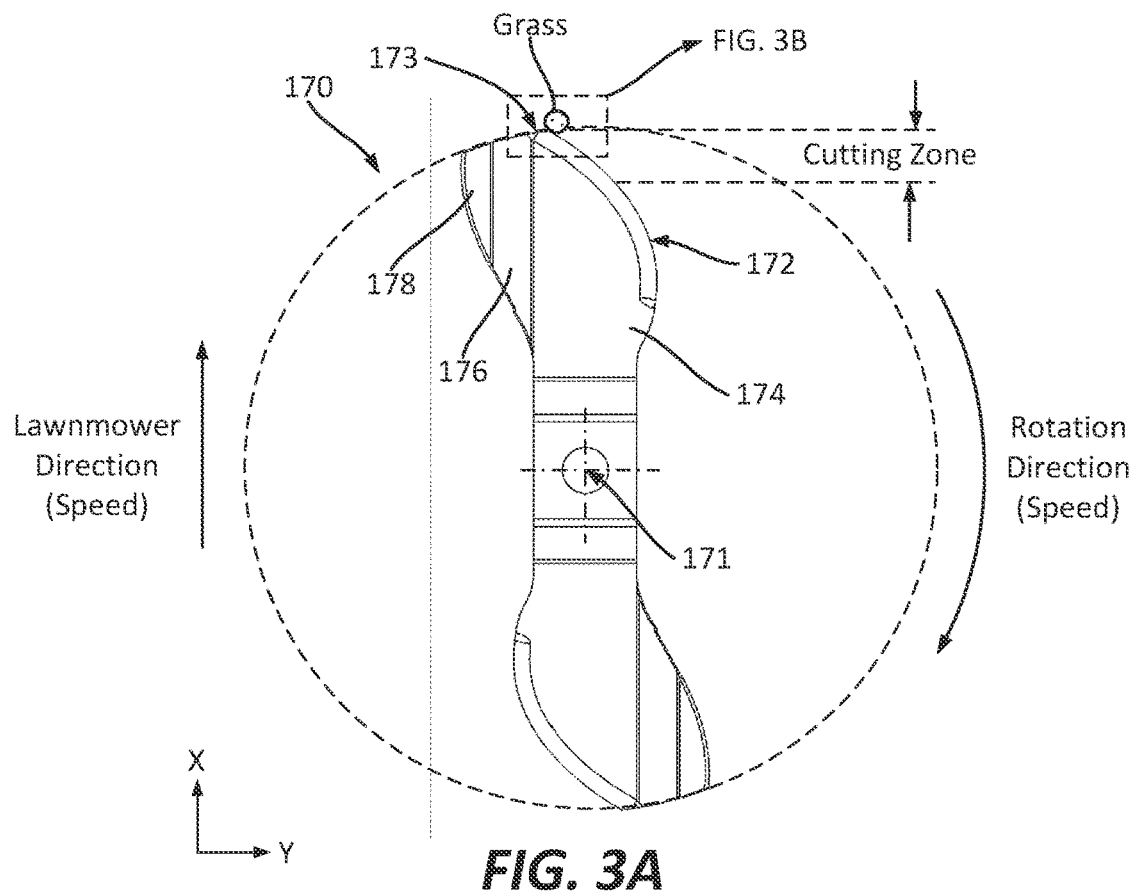
FIG. 3A is a schematic top view of a cutting blade, in accordance with some examples.
Figure 3B:
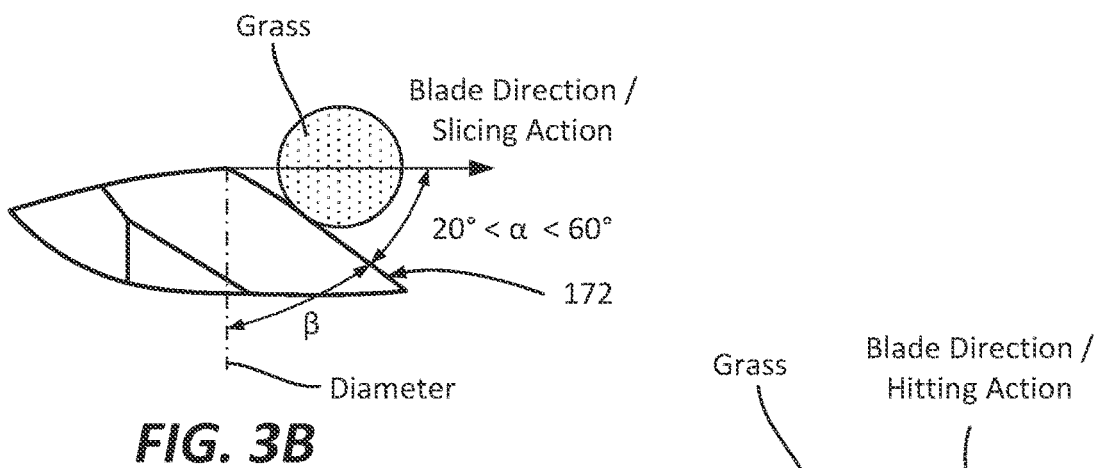
FIG. 3B is a schematic expanded view of a portion of the cutting blade in FIG. 3A, in accordance with some examples.
Figure 3C:
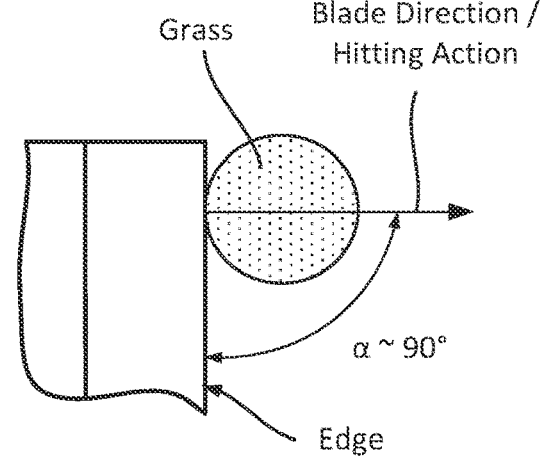
FIG. 3C is a schematic expanded view of a conventional cutting blade, in accordance with some examples.
Figure 4A:
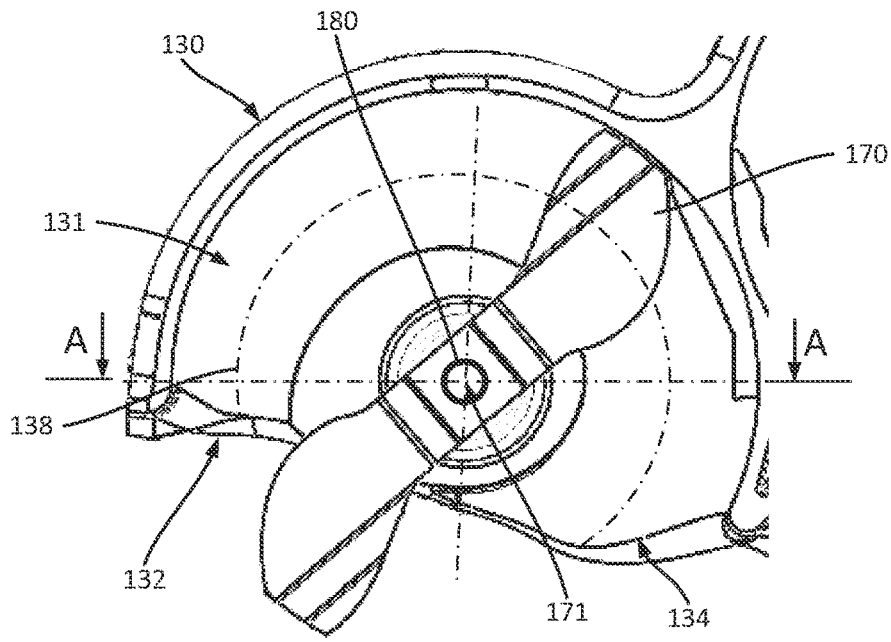
FIG. 4A is a schematic bottom view of a portion of the mowing unit in FIG. 2B identifying different components of the cutting unit, in accordance with some examples.
Figure 4B:
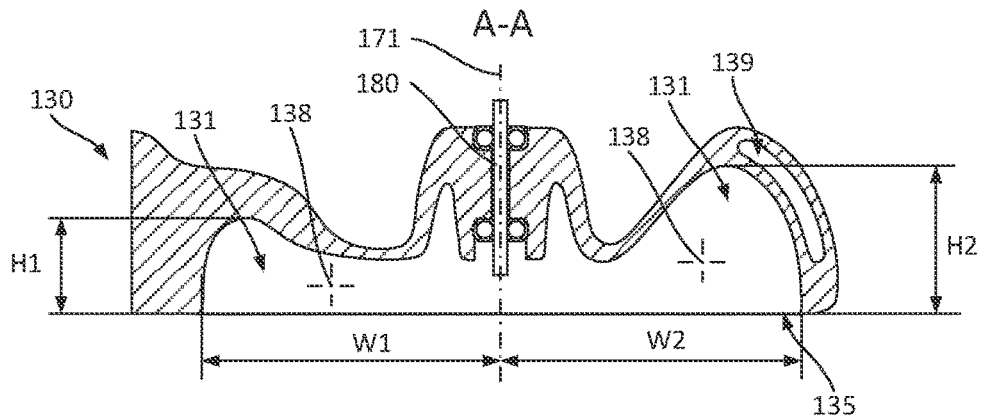
FIG. 4B is a schematic cross-sectional view of the blade enclosure of a mowing unit, in accordance with some examples.

Briefly referring to FIGS. 2A, 4A, and 4B, blade enclosure 130 forms an enclosure tunnel 131 defining tunnel inlet 132, tunnel outlet 134, tunnel center axis 138 extending about blade center axis 171 between tunnel inlet 132 and tunnel outlet 134. As shown in FIG. 2B, each enclosure tunnel 131 is fluidically coupled to the discharge conduit 112 at the tunnel inlet 132 and tunnel outlet 134. As further described below with reference to FIGS. 4A, 4B, and 4C, the enclosure tunnel 131 has a cross-sectional area that increases from tunnel inlet 132 to tunnel outlet 134. Finally, as further described below with reference to FIGS. 3A, 3B, and 3C, the cutting blade 170 comprises cutting edge 172 having a curved shape.

Cutting Blade Examples

FIG. 3A illustrates a cutting blade 170, which comprises a cutting edge 172 having a curved shape. While the cutting blade 170 has two cutting edges 172, on different sides of the blade center axis 171, for simplicity, the reference will be made to one of these cutting edges 172. Curving the cutting edge 172 changes an approach angle ($\alpha$) between cutting edge 172 and the moving direction of cutting edge 172, e.g., as schematically shown in FIG. 3B. In some examples, the approach angle ($\alpha$) can be 20°-60° or, more specifically, 30°-50° or even 40°-45°. For comparison, the approach angle ($\alpha$) of a conventional straight blade is about 90°, e.g., as schematically shown in FIG. 3C. Reducing the approach angle allows transforming the collision/hitting action (shown in FIG. 3C) into a slicing action (shown in FIG. 3B). It should be noted that with very small approach angles, the cutting edge 172 will start pushing grass stems out of the way rather than cutting through these grass stems. It has been experimentally found that the approach angle needs to be at least 10° or even 20° (depending on the speed, grass characteristics, and other parameters). At the same time, large approach angles (e.g., greater than 60°) require faster rotation speeds to ensure sufficient cutting action.

It should be noted that the moving direction of the cutting edge 172 (while the cutting blade 170 rotates), or more specifically, the moving direction of each point forming the cutting edge 172 is perpendicular to a radial axis ("diameter") extending through this point. As such, the curvature of the cutting edge 172 can be also defined by the angle between this point on the cutting edge 172 and its corresponding radial axis, which may be referred to as a curvature angle ($\beta$) as shown in FIG. 3B. The sum of the curvature angle ($\beta$) and the approach angle ($\alpha$) is 90°. As such, the curvature angle ($\beta$) of the cutting edge 172 can be 30°-70° or, more specifically, 50°-60° or even 45°-50°. For comparison, the approach angle ($\alpha$) of a conventional straight blade is about 0°.

Furthermore, it should be noted that the approach angle ($\alpha$) can vary along the cutting edge 172. In some examples, the approach angle ($\alpha$) is increased as the points along the cutting edge 172 are getting close to the blade center axis 171. It should be noted that only the outermost portion of cutting edge 172 defines the cutting zone, while the parts of cutting blade 170, which are closer to blade center axis 171, do not participate in cutting. Specifically, the electric lawnmower 100 advances along its path (defined by the X axis in FIG. 3A) with a certain linear speed, and the cutting blade 170 rotates and cuts the grass that overlaps with the blade path. This cutting zone is a function of the blade's rotational speed and the lawnmower's liner speed, i.e., the cutting zone becomes larger with a slower blade's rotational speed and a faster lawnmower's liner speed. Even at reduced rotational speed (e.g., less than 3,000 RPMs, less than 2,500 RPMs, or even less than 2,000 RPMs), the cutting zone extends less than 20% of the total radius of the cutting blade 170, less than 15%, or even less than 10% from the end 173 of the cutting blade 170 (with the end 173 being defines as the point furthest away from the blade center axis 171).

The slicing action (FIG. 3B) is more efficient than the hitting action (FIG. 3C) since a larger portion (segment length) of cutting edge 172 comes in contact and passes through a grass stem. This contact portion is defined by a "cutting projection," which is effectively the diameter of the grass stem in the hitting action example or the diameter/sin ($\alpha$) in the slicing action example. As such, reducing the approach angle ($\alpha$) increases this cutting projection.

Figure 3D:
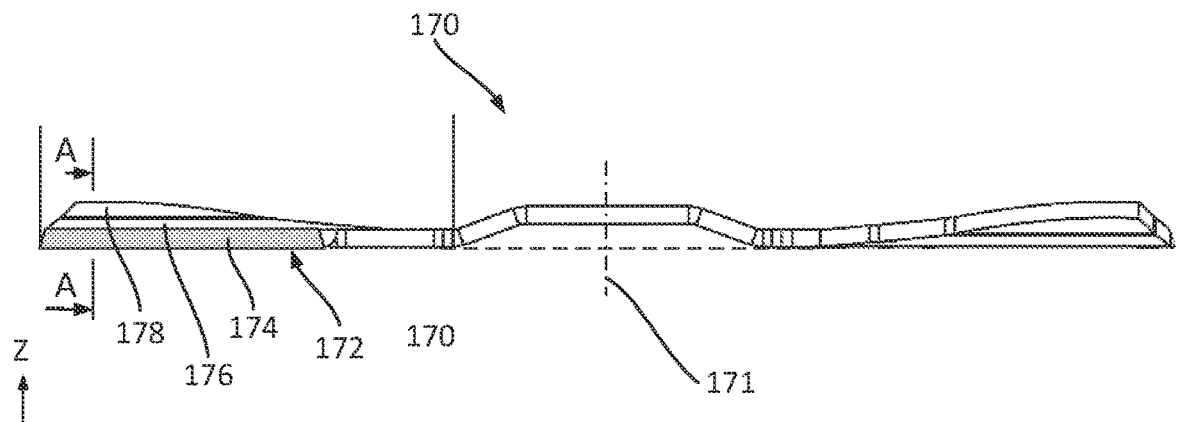
FIG. 3D is a schematic side view of the cutting blade in FIG. 3A, in accordance with some examples.
Figure 3E:
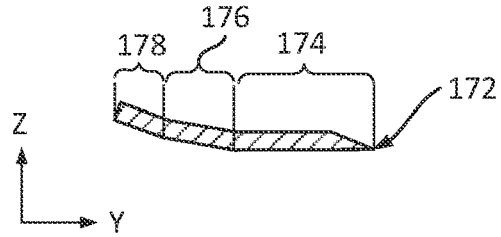
FIG. 3E is a schematic cross-sectional view of the cutting blade in FIG. 3D, in accordance with some examples.
Figure 3F:
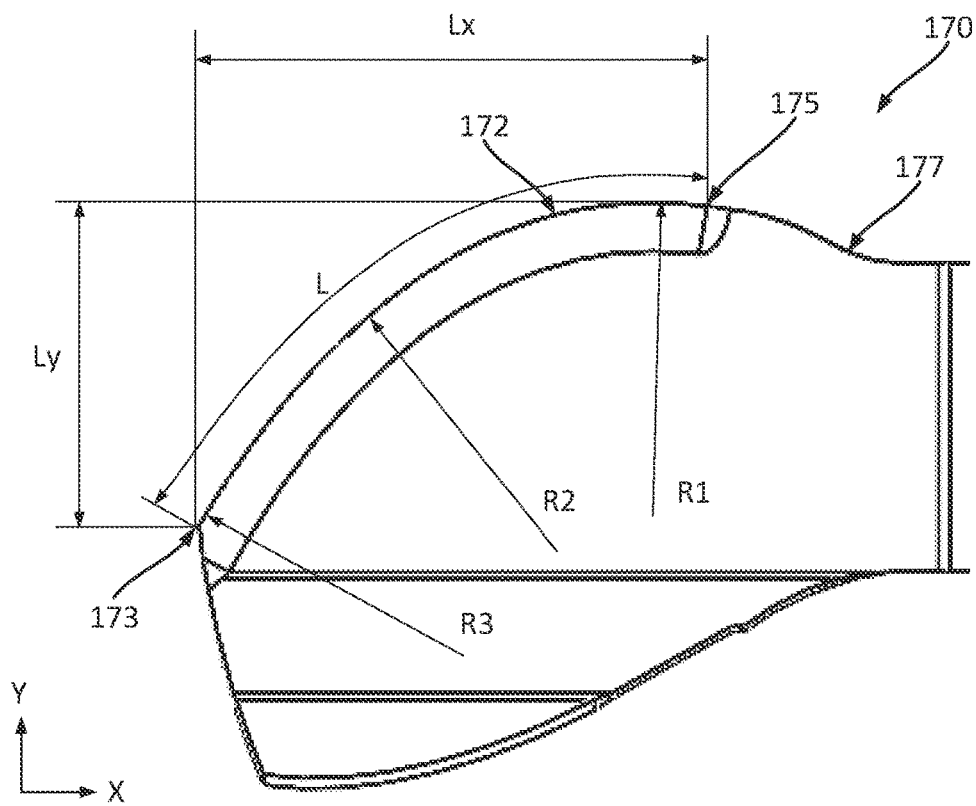
FIG. 3F is a schematic illustration of various features of the cutting blade in FIG. 3A, in accordance with some examples.

Referring to FIG. 3F, in some examples, the cutting edge 172 has a curvature radius that varies (e.g., R1≠R2≠R3). For example, the curvature radius of cutting edge 172 may get smaller as the cutting edge 172 extends closer to the blade center axis 171 (e.g., R1<R2<R3). In some examples, the curvature radius of the cutting edge 172 at the point closest to the blade center axis 171 (at the edge start 175) is at least 25% smaller or even 50% smaller than the curvature radius of cutting edge 172 at the point furthest away from the blade center axis 171 (which may be referred to the edge end 173 or a cutting corner of cutting blade 170). It should be noted that not all edges of the cutting blade 170 can be defined as the cutting edge 172. A portion of this edge, extending between the cutting edge 172 and the center of the cutting blade 170 (extending through the blade center axis 171) may be referred to as a supporting edge 177.

Referring to FIGS. 3D and 3E, in some examples, cutting blade 170 comprises a cutting portion 174, a transition portion 176, and a lifting portion 178 such that the cutting edge 172 is a part of the cutting portion 174. It should be noted that FIG. 3E represents a circumferential cross-sectional view. The transition portion 176 interconnects the lifting portion 178 and the cutting portion 174. Both the transition portion 176 and the lifting portion 178 protrude away from a plane defined by the cutting portion 174. In more specific examples, the transition portion 176 forms an angle of 5-15° relative to the plane defined by cutting portion 174. In the same or other examples, the lifting portion 178 forms an angle of 15-30° relative to the plane defined by the cutting portion 174. These transition portion 176 and lifting portion 178 are specifically designed to create an upward airflow (i.e., in the Z-axis direction) thereby lifting grass stems as the cutting blade 170 passes over the stems. On the next pass, these lifted stems can be sliced/cut by the cutting edge 172. Furthermore, these transition portion 176 and lifting portion 178 help to push the grass clippings away from the ground and into the enclosure tunnel 131 and eventually into the discharge conduit 112 (to be discharged through the comprising discharge opening 114).

Figure 3G:
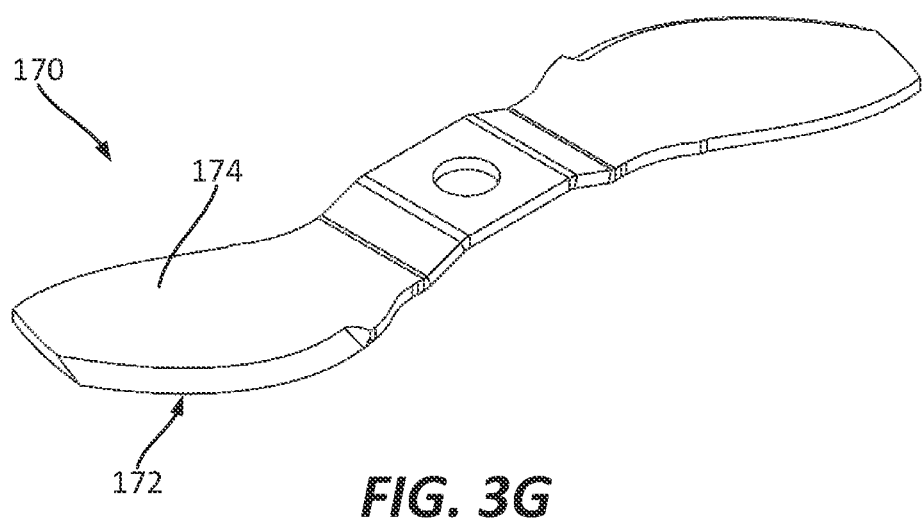
FIG. 3G is a schematic perspective view of another example of the cutting blade (which may be referred to as a mulching blade), in accordance with some examples.
Figure 3H:
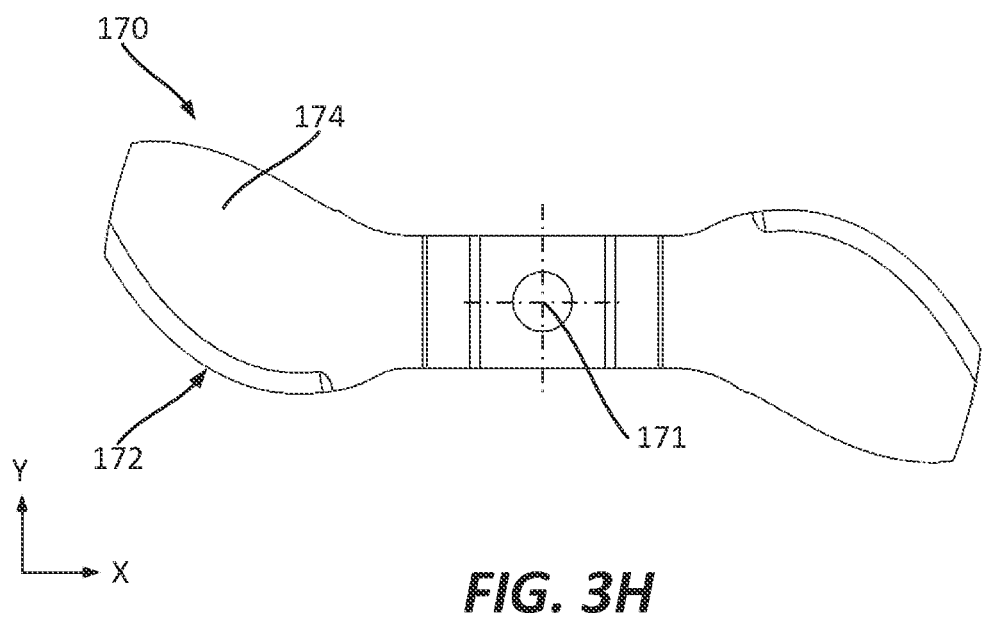
FIG. 3H is a schematic top view of the cutting blade in FIG. 3G, in accordance with some examples.

FIGS. 3G and 3H illustrate another example of cutting blade 170 that does not include any lifting portion. This type of cutting blade 170 can be used, e.g., for mulching. In these examples, the mowing-unit enclosure 122 may not have a discharge conduit 112. The cutting blade 170 in this example may create less turbulence than the blade shown in FIGS. 3D and 3E and, therefore, provide a quiter operation of the electric lawnmower 100.

Blade Shield Examples

As noted above, reducing the blade speed also reduces the airflow and the ability to remove grass clipping from the blade enclosure. However, changing the profile of the blade enclosure 130 or, more specifically, of the enclosure tunnel 131 helps to improve this grass clipping removal (despite lower blade speeds). Specifically, the cross-sectional area of enclosure tunnel 131 can increase from tunnel inlet 132 to tunnel outlet 134 along tunnel center axis 138.

For context, a conventional lawnmower uses a blade enclosure with a flat top and a substantially round shape around the center axis. This enclosure can be formed by stamping a metal sheet into a desired shape. As such, the cross-sectional profile of a tunnel, formed by this enclosure around the center axis and within which the blades rotate, is generally constant. As the blade rotates within such an enclosure, the blade faces roughly the same air resistance regardless of the position of the blade within the enclosure, e.g., relative to the enclosure outlet used to remove grass clippings.

Figure 4C:
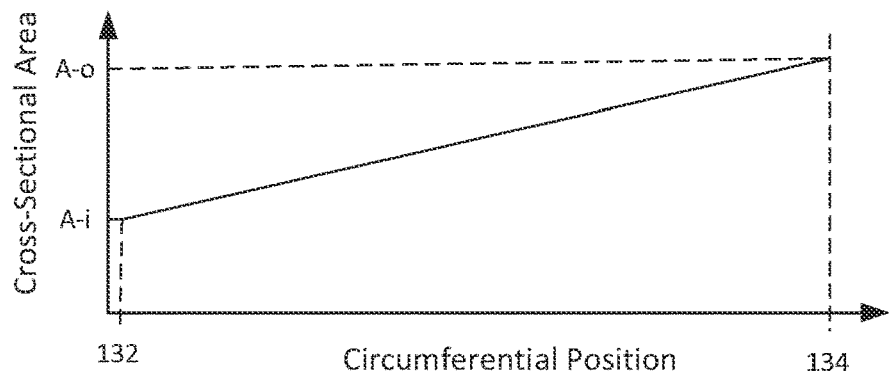
FIG. 4C is a plot of the cross-sectional area of the enclosure tunnel within the blade enclosure, in accordance with some examples.

Referring to FIG. 4A, the blade enclosure 130 forms an enclosure tunnel 131 defining a tunnel inlet 132, a tunnel outlet 134, and a tunnel center axis 138 extending between the tunnel inlet 132 and tunnel outlet 134. Referring to FIG. 2B, the enclosure tunnel 131 is fluidically coupled to the discharge conduit 112 at the tunnel inlet 132 and tunnel outlet 134. In some examples, the enclosure tunnel 131 has a cross-sectional area that increases from the tunnel inlet 132 to the tunnel outlet 134. In more specific examples, this increase is gradual, e.g., as shown in FIG. 4C (with "A-i" representing the cross-sectional area at tunnel inlet 132 and "A-o" representing the cross-sectional area at tunnel outlet 134). This increase in the cross-sectional area can be attributed predominantly (e.g., more than 50% or even more than 80%) to the increase in the channel height (H) or, more specifically, to the average tunnel height since the channel height can vary across the width of the tunnel width (W). However, some contribution to this cross-sectional area increase from the tunnel width (W) can be present as well. In some examples, both the tunnel height and tunnel width increase as the tunnel extends from the tunnel inlet 132 to the tunnel outlet 134. The increase in the tunnel cross-sectional area allows more easily to move the air and grass clippings through enclosure tunnel 131, especially as these grass clippings accumulate within enclosure tunnel 131 by being cut by the cutting blade 170. Overall, the profile of enclosure tunnel 131 can be specifically designed for noise reduction and grass clipping removal.

Referring to FIGS. 4A and 4B, in some examples, the enclosure tunnel 131 has a tunnel center axis 138 defined by a geometric center of the cross-sectional area of the enclosure tunnel 131. The blade enclosure 130 comprises an enclosure opening 135 (which may be referred to as the bottom opening and which is perpendicular to the blade center axis 171) providing access for grass to enclosure tunnel 131. In some examples, the tunnel center axis 138 is not parallel to the enclosure opening 135 (indicating that the average height of enclosure tunnel 131 can vary). In some examples, the enclosure opening 135 is planar. However, at least the interior walls of enclosure tunnel 131 may be predominantly curved.

Referring to FIG. 4B, in some examples, blade enclosure 130 comprises a fluid passage 139 extending within the wall of blade enclosure 130 and sealed from the environment. The fluid passage 139 can be coupled to the rest of the cooling system of electric lawnmower 100, which may also include mowing-unit electric motor 118, drive motor 105, and/or battery 104 as will now be described in more detail.

Additional Cutting Blade Examples

FIG. 5 is a schematic cross-sectional view of another example of a cutting blade 170 comprising wingtips 179. Specifically, the cutting blade 170 comprises a cutting portion 174, which can be substantially planar (e.g., positioned substantially within the X-Y plane), which the wingtip 179 can be connected to and extend at an angle (α) relative to the cutting portion 174. In some examples, the angle (α) between the wingtip 179 and the cutting portion 174 is at least 90° or even at least 110°, such as between 90-150° or, more specifically, between 100-130°.

Such wingtips 179 improve the aerodynamics of the cutting blade 170. Specifically, wingtips 179 can be shaped to minimize the formation of vortices (i.e., swirling air currents) that are significant sources of drag. Furthermore, wingtips can enhance the lift generated by the cutting blade 170 (e.g., to lift the grass for cutting and to help direct grass clipping to the discharge conduit 112). Specifically, any vortices can disrupt the smooth airflow over the cutting blade 170 thereby reducing lift. It should be noted that reduced drag and increased lift contribute to greater aerodynamic efficiency of the cutting blade 170 and reduce the power needed to rotate the cutting blade 170 thereby allowing the electric lawnmower 100 to operate longer on the same battery charge, which is particularly important for the electric lawnmower 100. Finally, the wingtip 179 can be configured to reduce the noise generated by the cutting blade 170, which is an important consideration as noted above.

Figure 7A:
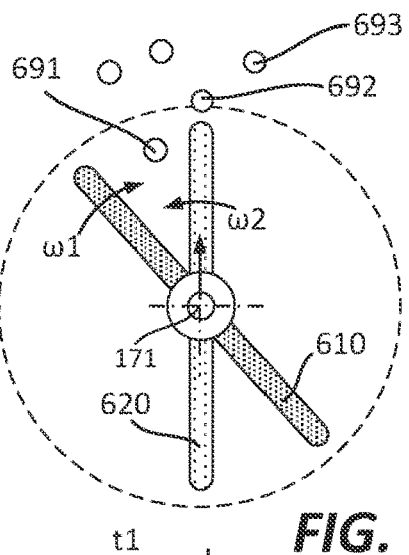
FIGS. 7A-7C are schematic views of the rotary mowing unit of FIGS. 6A-6B with reference to cutting objects at different times, in accordance with some examples.
Figure 7B:
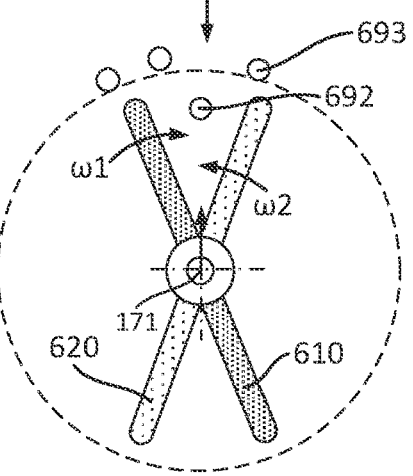
Figure 7C:
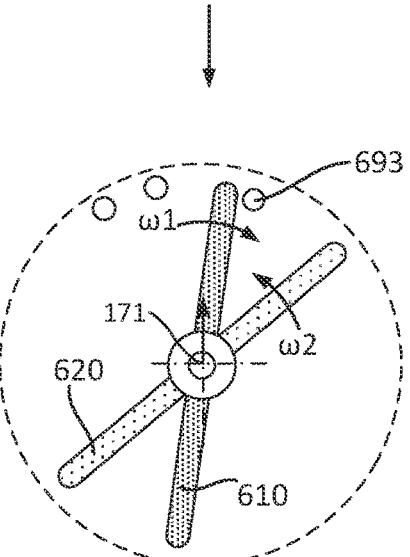

FIGS. 6A and 6B are schematic views of a rotary mowing unit 600 illustrating two cutting blades (i.e., a first blade 610 and a second blade 620) rotating in opposite directions and creating a scissor-like effect, in accordance with some examples. The first blade 610 and second blade 620 can be driven by the same shaft 180, through a special gearing mechanism 630 providing rotations in the opposite directions. Furthermore, the first blade 610 and second blade 620 may have different rotation speeds (e.g., $\omega 1$ and $\omega 2$, respectively). With the different rotation speeds, the first blade 610 and second blade 620 overlap at different locations along the circumference. This change in the overlap location is schematically shown in FIGS. 7A-7C, which are schematic views of the rotary mowing unit 600 of FIGS. 6A-6B with reference to cutting objects at different times, in accordance with some examples. Specifically, FIG. 7A illustrates the position of the first blade 610 and second blade 620 at the first time (t1) prior to cutting the first object 691. FIG. 7B illustrates the position of the first blade 610 and second blade 620 at a second time (t2) prior to cutting the second object 692. Specifically, the blade overlap location has shifted between the first time (t1) and the second time (t2) due to the different rotation speeds of the blades thereby allowing to cut objects that are positioned at a different circumferential position relative to the blade center axis 171. FIG. 7C illustrates the position of the first blade 610 and second blade 620 at a third time (t3) prior to cutting the third object 693. Specifically, the blade overlap location has further shifted between the second time (t2) and the third time (t3) due to the different rotation speeds of the blades thereby allowing to cut objects that are positioned at a different circumferential position relative to the blade center axis 171. It should be noted that for blade overlap location changes its circumferential position with the rotation speed of $(\omega 1-\omega 2)/2$.

Figure 8:
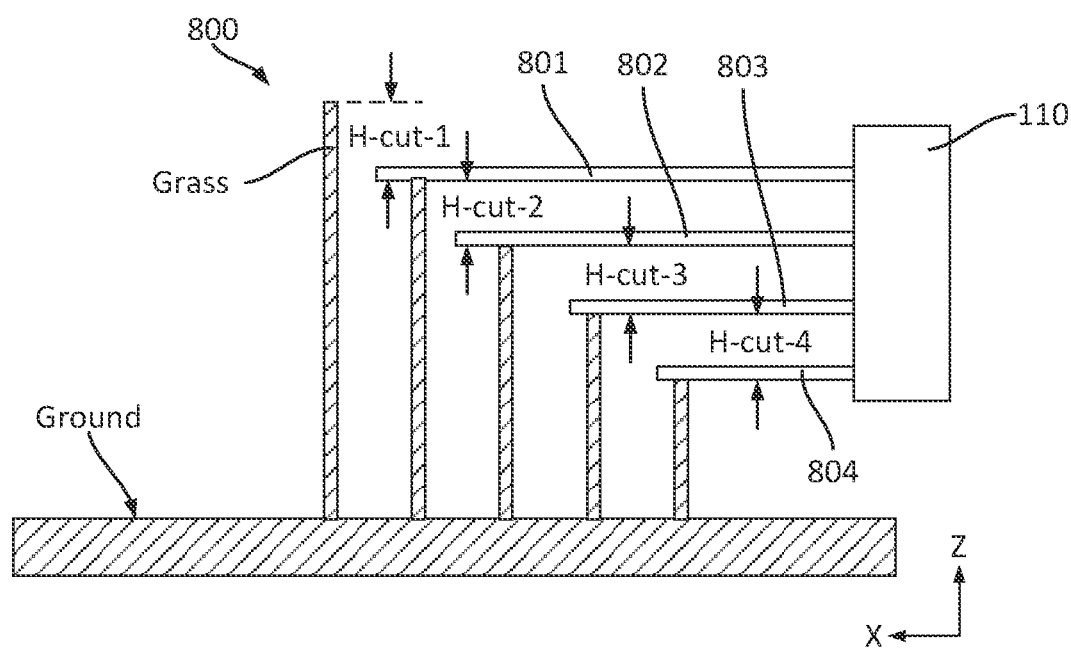
FIG. 8 is a schematic view of a progressive cutting for grass mulching using multiple cutting blades, in accordance with some examples.

FIG. 8 is a schematic view of a progressive cutting for grass mulching using a set of multiple cutting blades 800, in accordance with some examples. Specifically, the set of multiple cutting blades 800 comprises four cutting blades in this example, i.e., the first cutting blade 801, the second cutting blade 802, the third cutting blade 803, and the fourth cutting blade 804. These blades are offset relative to each other along the Z-axis. This offset determines the cut length/height (H-cut) provided by each blade. Specifically, the first cutting blade 801 may cut the first height (H-cut-1) from uncut grass. This first cut height (H-cut-1) may depend on the total height of the uncut grass and the position of the first cutting blade 801 relative to the ground. Each of the second, third, and fourth cut heights (H-cut-2, H-cut-3, and H-cut-4) depends on the gap between the set of corresponding blades. Each cut height is selected based on the desired mulching level. It should be noted that the fourth cutting blade 804 can yield the same final grass length while producing an excessive length of the cut piece (not providing sufficient mulching).

Furthermore, the first cutting blade 801, second cutting blade 802, third cutting blade 803, and fourth cutting blade 804 may have different diameters (e.g., the first cutting blade 801 has the largest diameter, while the fourth cutting blade 804 has the smallest diameter) to ensure that the first cutting blade 801 completes its cut first, followed by the second cutting blade 802, and on.

Liquid Cooling Examples for Electric Lawnmowers

Figure 9A:
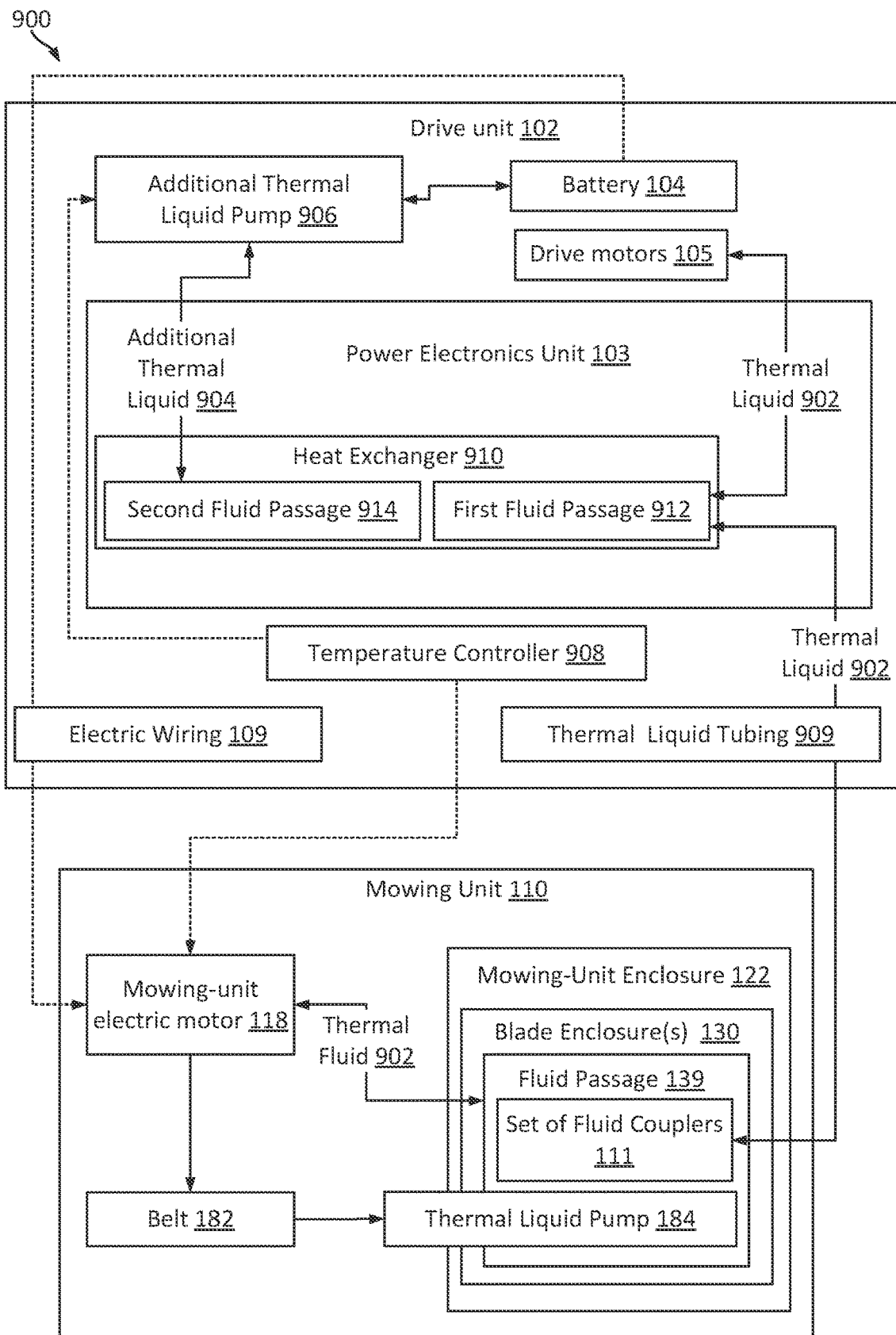
FIG. 9A is a block diagram of a thermal management system of an electric lawnmower, in accordance with some examples.

When an electric lawnmower 100 operates, various components of the electric lawnmower 100 can be heated (e.g., due to various operating power losses). As noted above, the drive unit 102 may comprise a battery 104, power electronics unit 103, and drive motor 105 powered by battery 104. Furthermore, a mowing unit 110 may be equipped with a mowing-unit electric motor 118 for rotating the cutting blade 170. Various aspects of these components are described above. In some examples, one or more thermal liquids may be used for cooling these components, collectively forming a thermal management system 900 of the electric lawnmower 100, e.g., as schematically shown in FIG. 9A. For example, the power electronics unit 103 and drive motor 105 (and, in some examples, the mowing-unit electric motor 118) may be cooled using a thermal liquid 902, which can be a water-based liquid. For example, various antifreeze and/or lubrication additives can be introduced into water to form a thermal liquid 902. The battery 104 may be immersion-cooled using an additional thermal liquid 904, which can be an oil-based liquid and which can be non-conductive. In other words, the electric lawnmower 100 may have one or more cooling circuits, which will now be described in more detail. Some immersion cooling aspects of the battery 104 are described below with reference to FIGS. 9G and 9H.

While the thermal liquid 902 and/or the additional thermal liquid 904 are heated by one or more of the battery 104, power electronics unit 103, and drive motor 105, the thermal management system 900 provides means for cooling one or both of these fluids using the mowing unit 110 or, more specifically, using the mowing-unit enclosure 122. Not only the mowing-unit enclosure 122 has a large thermal mass and a large heat-dissipating surface, but the bottom surface of the mowing-unit enclosure 122 is also exposed to significant airflow provided by the cutting blade 170 during the mower operation. Furthermore, this mower operation can generate significant dust and particles, which makes conventional cooling radiators not practical for this application. At least, such radiators have to be significant in size to match the cooling capabilities of the mowing-unit enclosure 122, which would increase the weight, size, and cost of the electric lawnmower 100 (all of which is highly undesirable). Finally, the mowing-unit electric motor 118, which is used to rotate the cutting blades 170, can be also used to drive the thermal-liquid pump 184 thereby eliminating the need for an additional motor.

As noted above, the mowing unit 110 can be coupled to the drive unit 102 and comprises a set of cutting blade units 120. Each unit in the set of cutting blade units 120 comprises a blade enclosure 130 and a cutting blade 170 at least partially surrounded by the blade enclosure 130. The blade enclosure 130 comprises a fluid passage 139, which is fluidically coupled to at least one component of the drive unit 102 that requires liquid cooling, e.g., the battery 104, power electronics unit 103, and/or drive motor 105.

Figure 9B:
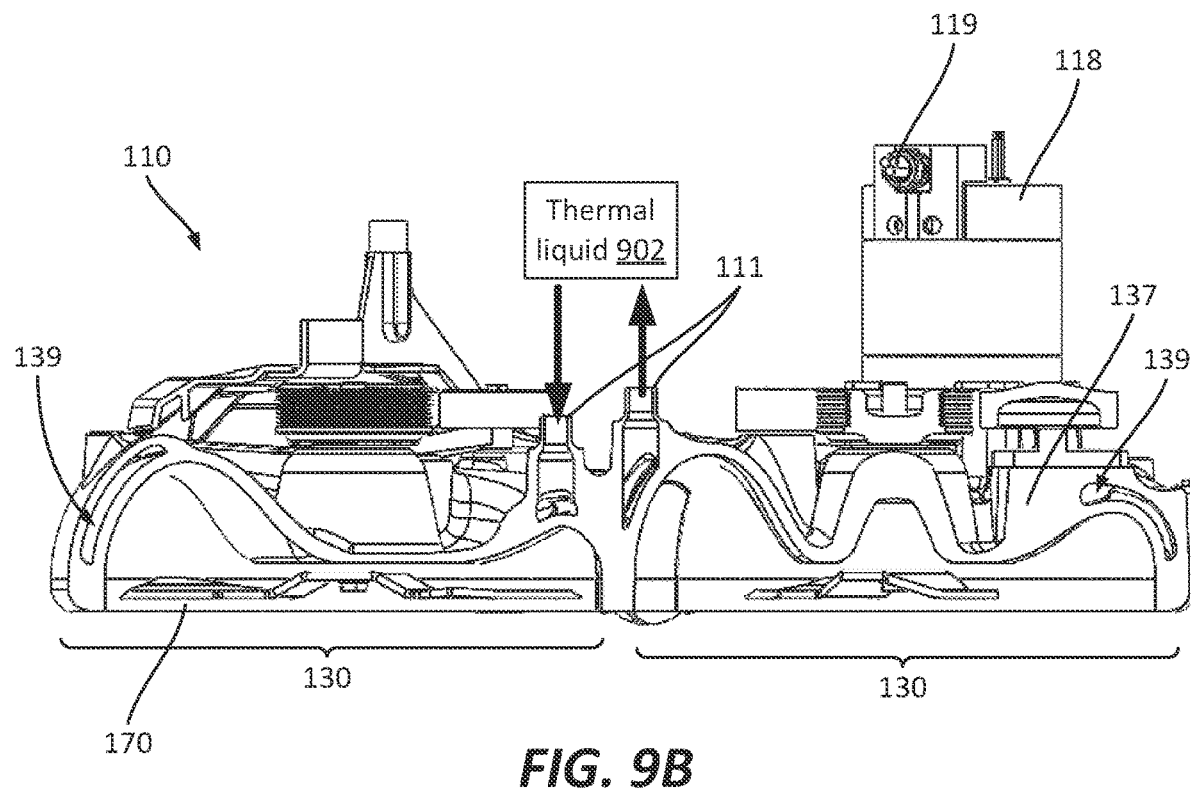
FIG. 9B is a schematic cross-sectional view of the mowing unit illustrating fluid passages and fluid couplers, in accordance with some examples.
Figure 9C:
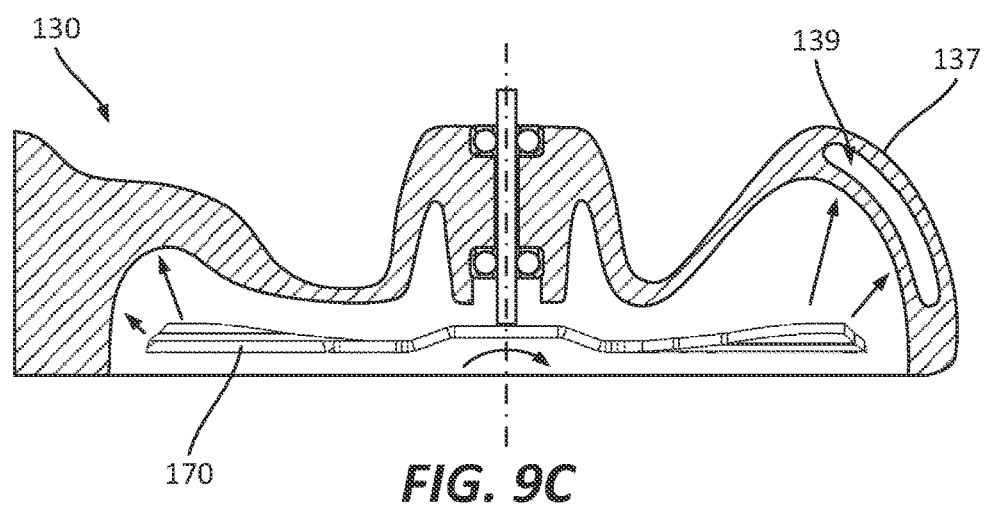
FIGS. 9C and 9D are schematic cross-sectional views of the blade enclosure of a mowing unit illustrating different examples of fluid passages within the blade enclosure.
Figure 9D:
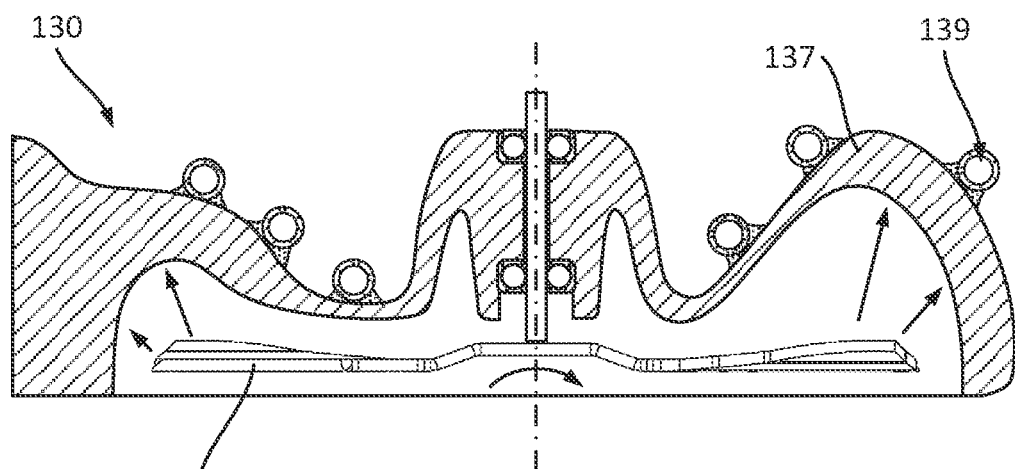
Figure 9E:
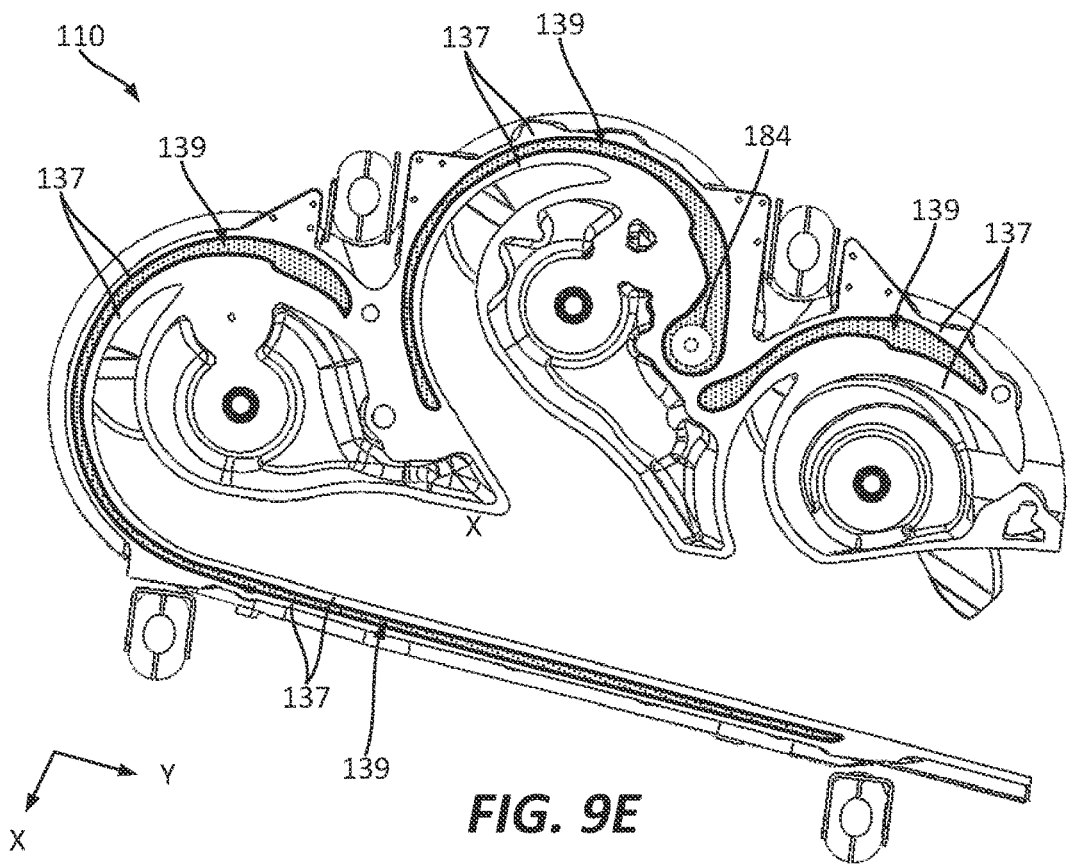
FIG. 9E is a schematic cross-sectional view of a mowing-unit enclosure illustrating a fluid passage passing through different blade enclosures of the mowing-unit enclosure, in accordance with some examples.

Referring to FIGS. 9B and 9C, in some examples, the fluid passage 139 is a cavity formed within wall 137 of the blade enclosure 130. For example, enclosure wall 137 can have two wall portions with the fluid passage 139 positioned between these wall portions, e.g., two stamped metal sheets can be welded together forming the fluid passage 139 therebetween. Alternatively, the blade enclosure 130 of each unit in the set of cutting blade units 120 is monolithically integrated into a mowing-unit enclosure 122 such that the mowing-unit enclosure 122 is a single-cast unit (e.g., from aluminum). The single-casting feature eliminates the need for multiple components and joining operations. Furthermore, the single-casting feature allows the formationing of a continuous fluid passage 139 that extends through multiple blade enclosures 130, e.g., as shown in FIG. 9E. Alternatively, referring to FIG. 9CD, the fluid passage 139 may be in the form of a pipe connected to an exterior surface of wall 137 of the blade enclosure 130. For example, a pipe may be routed and welded to different portions of the blade enclosure 130 or, more generally, of the mowing-unit enclosure 122.

Figure 9F:
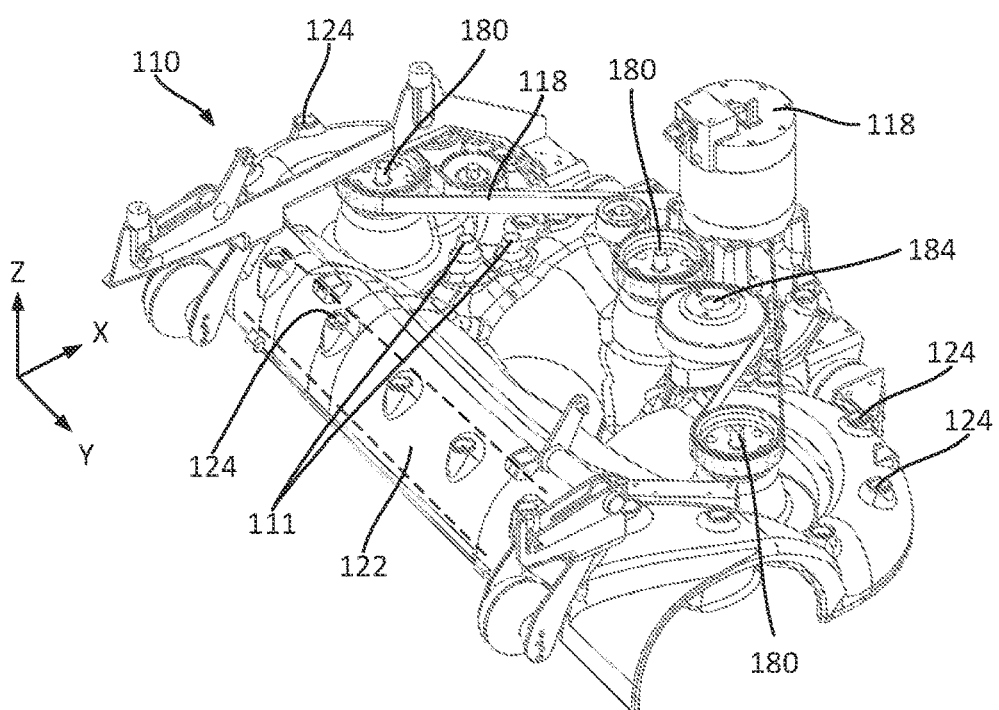
FIG. 9F is a schematic perspective view of a mowing unit illustrating some components and features of the thermal management system of the electric lawnmower, in accordance with some examples.

Referring to FIG. 9F, in some examples, mowing-unit enclosure 122 comprises a set of pressure-releasing plugs 124 distributed along the fluid passage 139 of the blade enclosure 130 in each unit in the set of cutting blade units 120. These pressure-releasing plugs 124 provide the escape route for the thermal liquid 902, e.g., when the thermal liquid 902 is over-pressurized within the fluid passage 139 (such as during freezing of the thermal liquid 902). Furthermore, these pressure-releasing plugs 124 can be provided to seal the openings within the mowing-unit enclosure 122 that are used to support a casting core, while forming the fluid passage 139.

Referring to FIG. 9F, in some examples, the mowing unit 110 comprises a thermal-liquid pump 184, extending into the fluid passage 139 of the blade enclosure 130 of one unit in the set of cutting blade units 120 and is mechanically coupled to the mowing-unit electric motor 118. For example, the mowing unit 110 comprises a belt 182 coupling the thermal-liquid pump 184 and the shaft 180 of each unit in the set of cutting blade units 120 to the mowing-unit electric motor 118. It should be noted that the same mowing-unit electric motor 118 and belt 182 are used to rotate the shaft 180 of each unit in the set of cutting blade units 120.

In some examples, the thermal-liquid pump 184 is configured to pump the thermal liquid 902 through the fluid passage 139 of the blade enclosure 130 of each unit in the set of cutting blade units 120 or, more generally, through the entire fluid passage 139 extending within the mowing-unit enclosure 122. Furthermore, the thermal-liquid pump 184 is configured to pump the thermal liquid 902 between the mowing unit 110 and the drive unit 102 or, more specifically, at least one of battery 104, power electronics unit 103, and drive motor 105 of the drive unit 102. For example, the power electronics unit 103 and drive motor 105 may share a cooling path with the fluid passage 139 of the mowing unit 110 (filled with the thermal liquid 902), while the battery 104 can be on a separate cooling path (filled with the additional thermal liquid 904) as further described below. Since the thermal-liquid pump 184 can pump the thermal liquid 902 through the components of the drive unit 102, the drive unit 102 does not need to have a separate drive/pump. As such, the entire pumping of the thermal liquid 902 can be achieved by the thermal-liquid pump 184, driven by the mowing-unit electric motor 118.

Referring to FIG. 9A, in some examples, the electric lawnmower 100 further comprises a temperature controller 908, configured to receive the temperature of the battery 104, power electronics unit 103, and/or drive motor 105. The temperature can be measured at the actual component and/or of the thermal liquid 902 existing from this component. The temperature controller 908 can be further configured to operate the mowing-unit electric motor 118 based on the temperature received from the battery 104, power electronics unit 103, and/or drive motor 105.

In some examples, the same thermal liquid can be used for liquid cooling of all desired components. Alternatively, multiple different thermal liquids can be used. As noted above, the power electronics unit 103 and drive motor 105 may be cooled using a thermal liquid 902, which can be a water-based liquid and can be electrically conductive. The battery 104 may be immersion-cooled using an additional thermal liquid 904, which is non-conductive. In these examples, the additional thermal liquid 904 can be cooled separately from the thermal liquid 902. Alternatively, the thermal liquid 902 can be used for cooling the additional thermal liquid 904. For example, the power electronics unit 103 comprises a heat exchanger 910 comprising a first fluid passage 912 and a second fluid passage 914 thermally coupled to each other (e.g., separated by a thin wall having a high surface area). The first fluid passage 912 is fluidically coupled to fluid passage 139 of the blade enclosure 130 of each unit in the set of cutting blade units 120 and is filled with the thermal liquid 902. The second fluid passage 914 is fluidically coupled with the battery 104 and is filled with an additional thermal liquid 904, different from the thermal liquid 902.

Figure 9G:
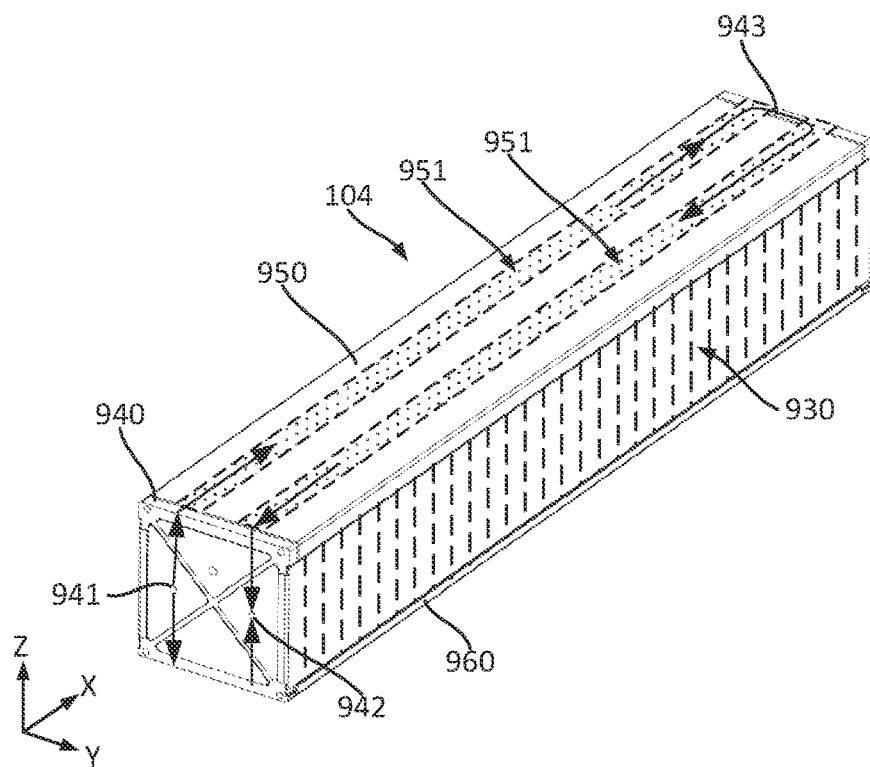
FIGS. 9G and 9H are schematic views of the battery illustrating various immersion-cooling features of the battery, in accordance with some examples.
Figure 9H:
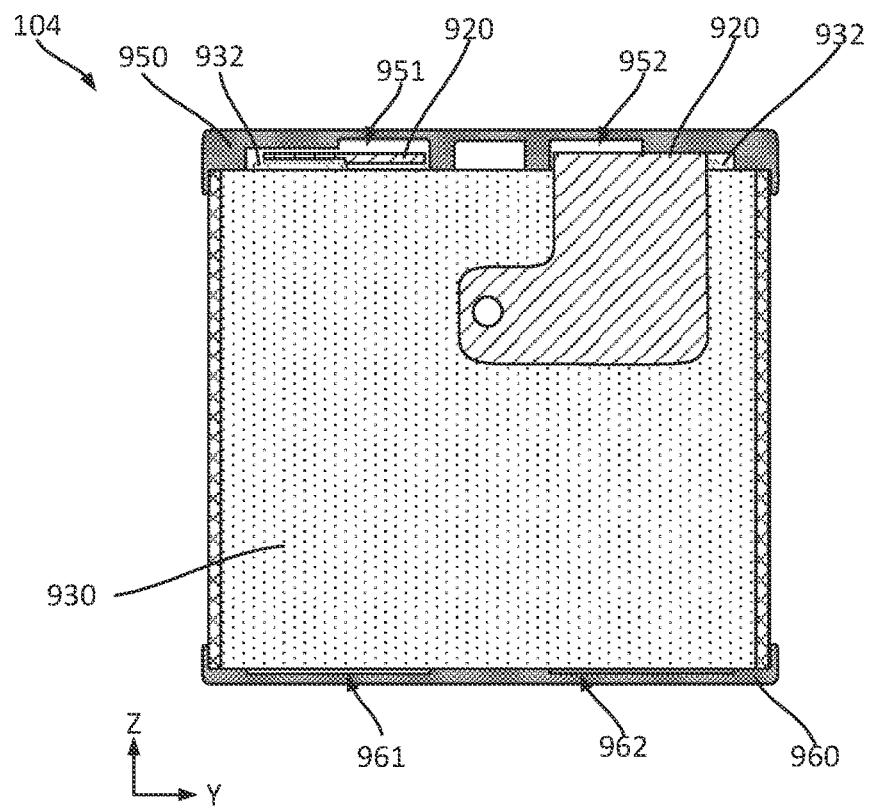

Referring to FIGS. 9G and 9H, in some examples, the battery 104 is an immersion-cooled battery comprising a set of bus bars 920 interconnecting cell terminals 932 of battery cells 930 provided within the battery 104. The battery 104 may be also referred to as a battery pack or, more specifically, an immersion-cooled battery pack. Specifically, when the thermal management system 900 is filled with thermal liquids, the set of bus bars 920 and the cell terminals 932 of the battery 104 are in direct contact with the additional thermal liquid 904. In these examples, the drive unit 102 comprises an additional thermal liquid pump 906 for pumping the additional thermal liquid 904 between the second fluid passage 914 is fluidically coupled with the battery 104.

Referring to FIG. 9G, the battery 104 comprises a first edge cover 940 and a second edge cover 943 such that the battery cells 930 are stacked between the first edge cover 940 and the second edge cover 943. The first side cover 940 comprises a fluid inlet 941 and a fluid outlet 942, which can be fluidically coupled to the second fluid passage 914 of the heat exchanger 910. The battery 104 also comprises a side cover 950 and an additional side cover 960. The side cover 950 forms a first channel 951 and a second channel 952. The set of bus bars 920 and cell terminals 932 can extend into or at least align with the first channel 951 and the second channel 952. The first channel 951 can be fludically coupled with the fluid inlet 941, while the second channel 952 can be fludically coupled with the fluid outlet 942. The second edge cover 943 fluidically interconnects the first channel 951 and the second channel 952. Similarly, the additional side cover 960 forms a first additional channel 961 and a second additional channel 962. A portion of the side of the battery cells 930, which is opposite to the set of bus bars 920 and cell terminals 932, is exposed to the first additional channel 961 and the second additional channel 962. The first additional channel 961 can be fluidically coupled with the fluid inlet 941, while the second additional channel 962 can be fludically coupled with the fluid outlet 942. The second edge cover 943 fluidically interconnects the first additional channel 961 and the second additional channel 962.

As such, when the additional thermal liquid 904 enters the fluid inlet 941, the first edge cover 940 distributes this additional thermal liquid 904 into the first channel 951 and the first additional channel 961. The additional thermal liquid 904 flows through these channels while cooling a portion of the set of bus bars 920 and the battery cells 930. The portion of the additional thermal liquid 904 from the first channel 951 is then redirected by the second edge cover 943 to the second channel 952 and this fluid portion flows to the first edge cover 940 and into the fluid outlet 942. Similarly, the other portion of the additional thermal liquid 904 from the first addition channel 961 is then redirected by the second edge cover 943 to the second additional channel 962 and this fluid portion flows to the first edge cover 940 and into the fluid outlet 942.

In some examples, the mowing unit 110 comprises a set of fluid couplers 111 providing dis-engageable fluidic couplings to at least one of the battery 104 and a drive motor 105 of the drive unit 102, e.g., using a thermal liquid tubing 909. The fluid passage 139 is fluidically connected to the set of fluid couplers 111.

Examples of Interchangeable Mowing Units

Conventional lawnmowers are designed to operate with specific mowing units (e.g., rotary mowers, reel mowers), which are not interchangeable. For example, a conventional lawnmower typically uses an internal combustion engine (e.g., gas, diesel), positioned on the drive unit. The power is delivered to the mowing unit using mechanical or hydraulic means, which are difficult to disengage and reengage, thereby resulting in the mowing unit not being interchangeable. For purposes of this disclosure, the term "interchangeable" is defined as designed to be replaced by a user (with another mowing unit) in the course of the lawnmower operation within a reasonable period of time (e.g., less than 15 minutes) and with minimal or any tooling needed. The interchangeable aspect should not be confused with a removable feature as any component can be removed with sufficient time and tools.

Figure 10A:
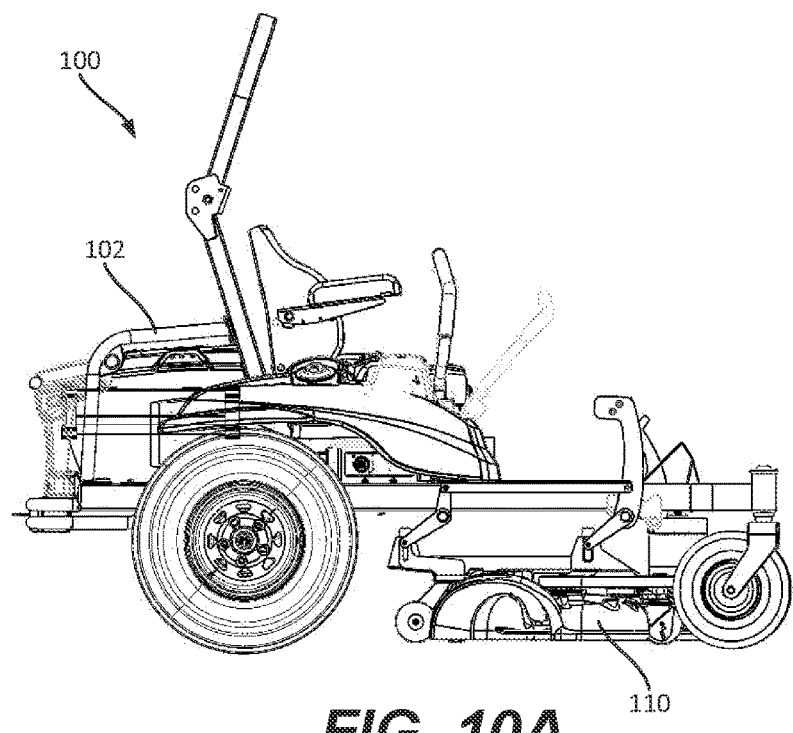
FIGS. 10A and 10B are schematic side views of an electric lawnmower illustrating different mowing units disengageably coupled to the drive unit, in accordance with some examples.
Figure 10B:
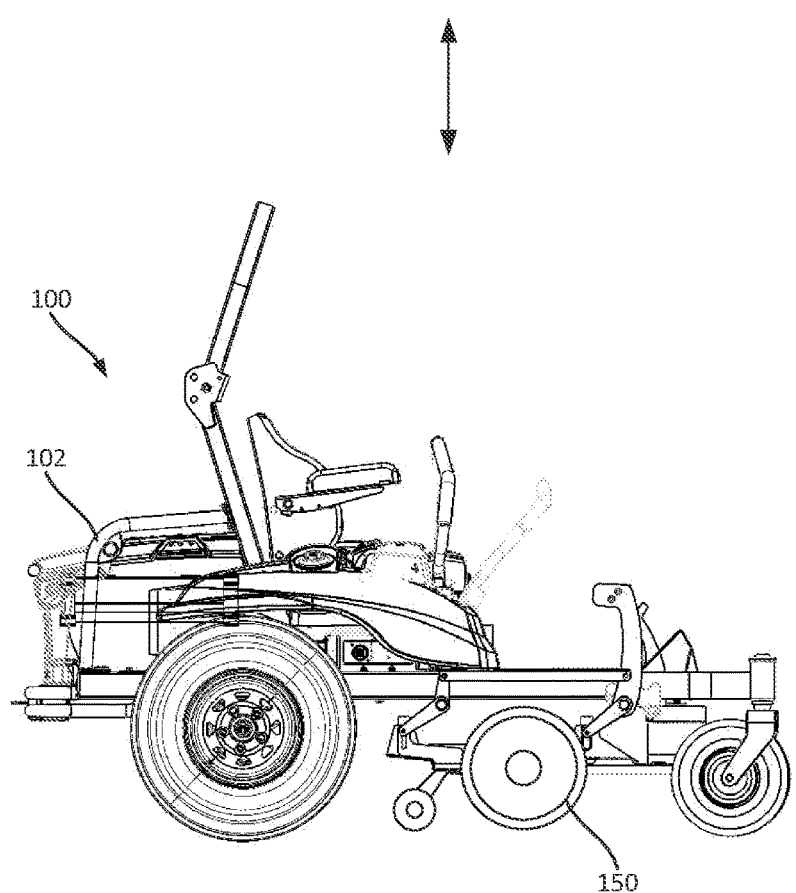

Described herein are electric lawnmowers comprising drive units and mowing units disengageably coupled to the drive units. For example, a drive unit can be disengageably coupled to any one of multiple mowing units (e.g., rotating mowing units, reel mowing units) collecting forming a mowing system. FIGS. 10A and 1013 are schematic side views of the same electric lawnmower 100 illustrating different mowing units disengageably coupled to drive unit 102, in accordance with some examples. Specifically, FIG. 10A illustrates a mowing unit 110 (which in this example is a rotary lawn mower) disengageably coupled to the drive unit 102. FIG. 1013 illustrates an additional mowing unit 150 (which in this example is a reel lawn mower) disengageably coupled to the drive unit 102.

Figure 10C:
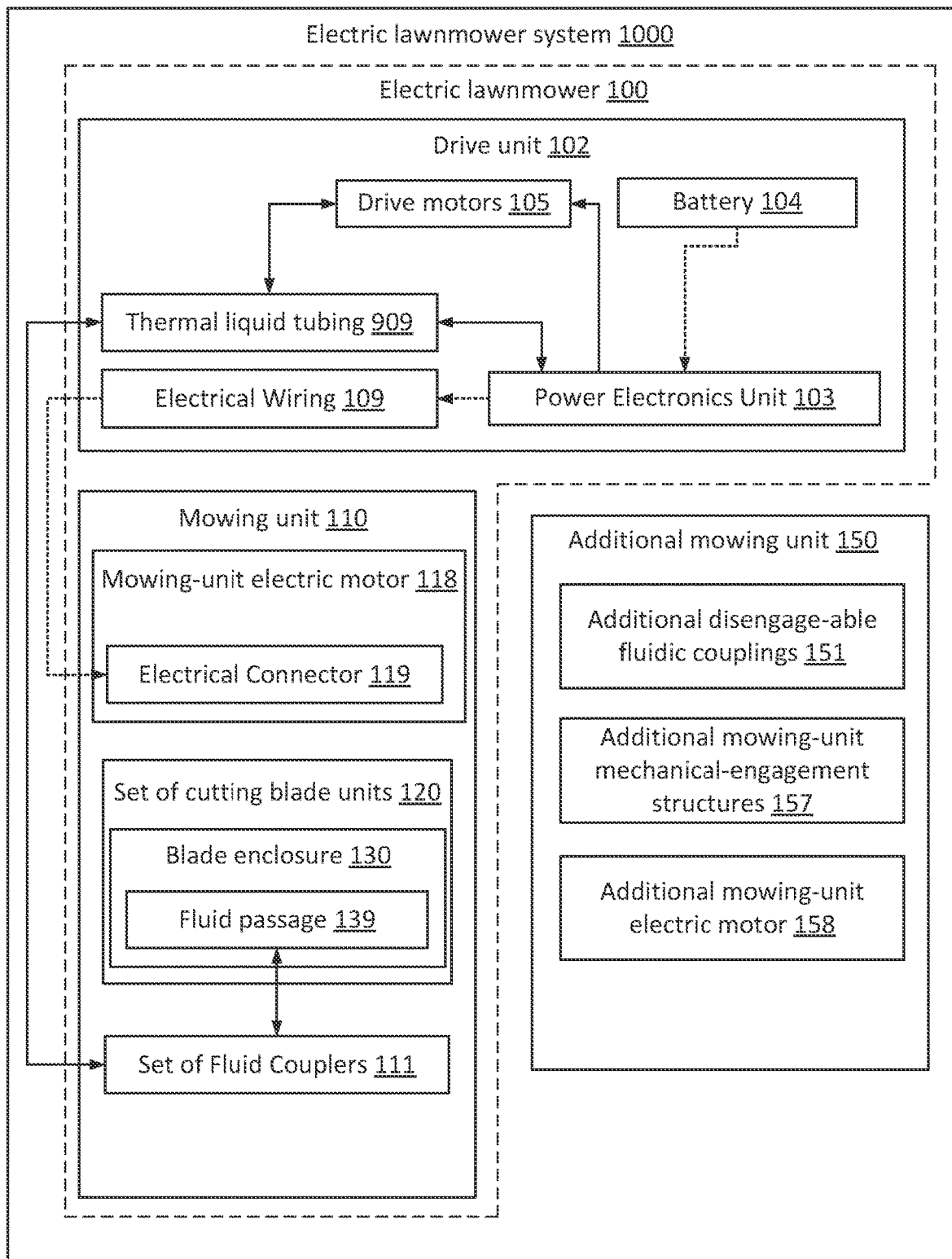
FIG. 10C is a block diagram of an electric lawnmower system comprising one drive unit and multiple mowing units, each capable of being disengageably coupled to the drive unit, in accordance with some examples.

Various features of the drive unit 102 and the mowing unit 110 providing this disengageable coupling will now be described with reference to FIGS. 10C, 10D, and 10E. It should be noted that the features of the mowing unit 110 are applicable to any type of mowing unit that can be attached to the drive unit 102. As such, the features of the additional mowing unit 150 are not separately described. Specifically, FIG. 10C is a block diagram of an electric lawnmower system 1000 comprising one drive unit 102 and multiple mowing units (e.g., a mowing unit 110 and an additional mowing unit 150). These mowing units can be of different types, e.g., rotary mowers, reel mowers, and the like. Each mowing unit is capable of being disengageably coupled to drive unit 102, in accordance with some examples. A combination of the drive unit 102 and one of the mowing units disengageably coupled to the drive unit 102 forms an electric lawnmower 100. As such, having different types of mowing units allows to form of different types of electric lawnmower 100, e.g., a rotary-type electric lawnmower, a reel-type electric lawnmower, etc. Some aspects of the drive unit 102 and mowing unit 110 are also described above. For example, a drive unit 102 can comprise a power electronics unit 103, a battery 104, and a drive motor 105.

Figure 10D:
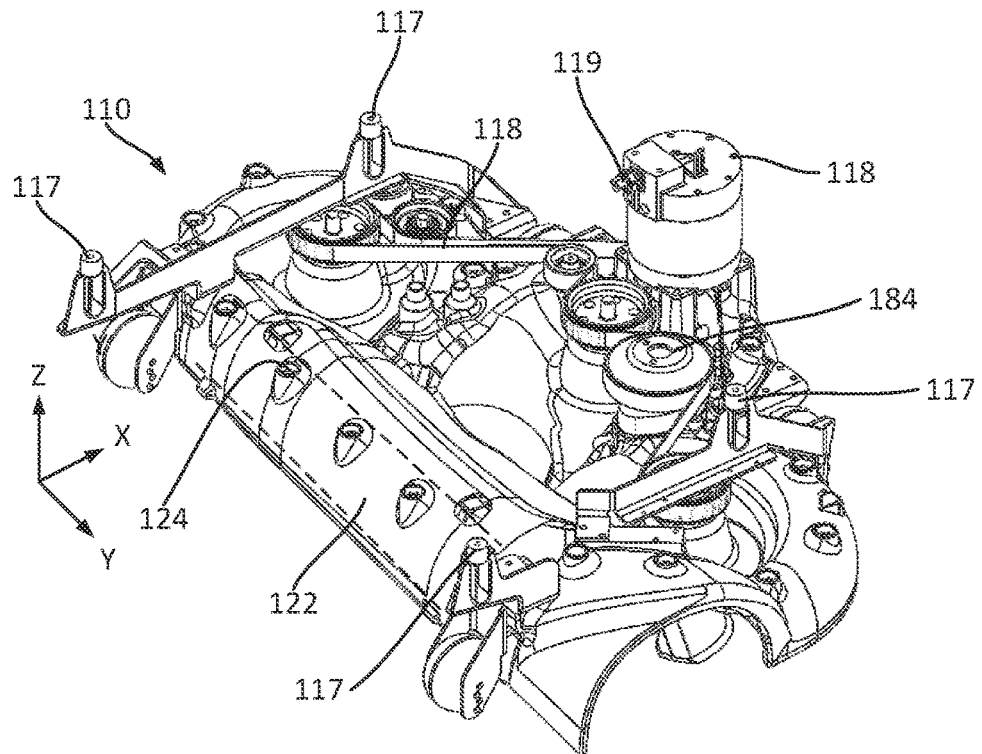
FIG. 10D is a schematic perspective view of a mowing unit illustrating some components and features of the mowing unit enabling the disengageable coupling to the drive unit, in accordance with some examples.
Figure 10E:
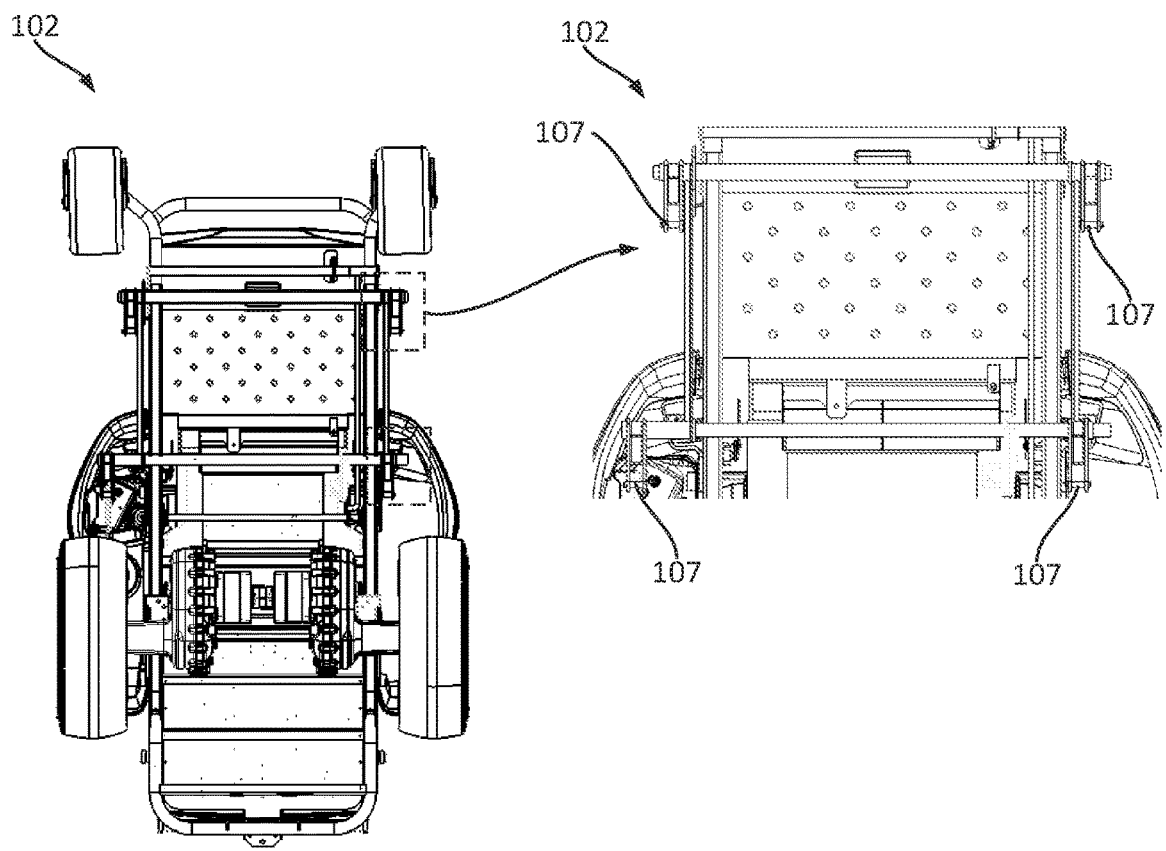
FIG. 10E is a schematic bottom view of a drive unit illustrating some components and features of the drive unit enabling the disengageable coupling to the mowing unit, in accordance with some examples.

Referring to FIGS. 10C and 10D, in some examples, mowing unit 110 can comprise a mowing-unit electric motor 118 and a set of cutting blade units 120. The mowing-unit electric motor 118 comprises an electric connector 119 disengageably coupled to electrical wiring 109 to the battery 104 of the drive unit 102. Various types of electric connectors 119 and corresponding electrical wiring 109 are within the scope. For example, the electrical wiring 109 can be flexible to enable routing of the wiring while the mowing unit 110 is being coupled to the drive unit 102.

As noted above, each unit in the set of cutting blade units 120 comprises a blade enclosure 130, a shaft 180 protruding through the blade enclosure 130, and a cutting blade 170 connected to the shaft 180 and at least partially surrounded by the blade enclosure 130. The shaft 180 of each unit in the set of cutting blade units 120 is mechanically coupled to the mowing-unit electric motor 118.

In some examples, the mowing unit 110 comprises a set of fluid couplers 111 disengageably coupled to a thermal liquid tubing 909 of the drive unit 102, some aspects of which are described below with reference to FIGS. 11A-11F. The thermal liquid tubing 909 is fluidically connected to at least one of the power electronics unit 103, the battery 104, and the drive motor 105 of the drive unit 102. Some of these connections are described above with reference to FIGS. 9A-9E. For example, the thermal liquid tubing 909 can be fluidically coupled to at least one or both of the power electronics unit 103 and the drive motor 105, but not to the battery 104. The battery 104 may be cooled using a separate cooling circuit provided by the power electronics unit 103.

Furthermore, as noted above, the blade enclosure 130 comprises a fluid passage 139, fluidically connected to the set of fluid couplers 111. In some examples, the mowing unit 110 comprises a thermal-liquid pump 184, extending into the fluid passage 139 of the blade enclosure 130 of one unit in the set of cutting blade units 120 and is mechanically coupled to the mowing-unit electric motor 118. For example, the mowing unit 110 comprises a belt 182 coupling the thermal-liquid pump 184 and the shaft 180 of each unit in the set of cutting blade units 120 to the mowing-unit electric motor 118.

Referring to FIG. 10D, in some examples, the mowing unit 110 comprises a set of mowing-unit mechanical-engagement structures 117. Referring to FIG. 10E, the drive unit 102 comprises a set of drive-unit mechanical-engagement structures 107 engaging the mowing-unit mechanical-engagement structures 117 when the mowing unit 110 is connected to the drive unit 102. The set of mowing-unit mechanical-engagement structures 117 protrudes into a corresponding set of cavities of the mowing-unit mechanical-engagement structures 117 when the mowing unit 110 is connected to the drive unit 102.

Examples of No-Spill Couplers

In some examples, each coupler in the set of fluid couplers 111 is a no-spill coupler. One example of such coupled is shown in FIGS. 11A-11F. When the set of fluid couplers 111 is connected to the thermal liquid tubing 909, this assembly may be referred to as a fluidic coupling 1100.

Figure 11A:
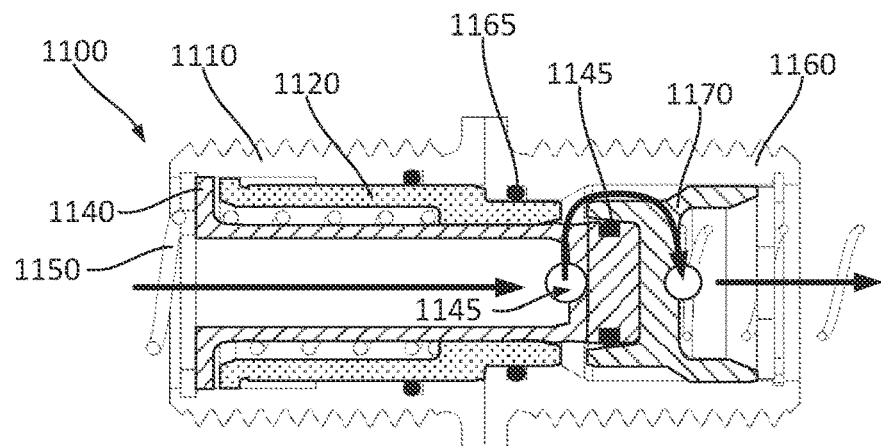
FIGS. 11A-11F are schematic illustrations of different stages of separating the fluidic coupling formed by a set of fluid couplers of the mowing unit and thermal liquid tubing, in accordance with some examples.
Figure 11B:
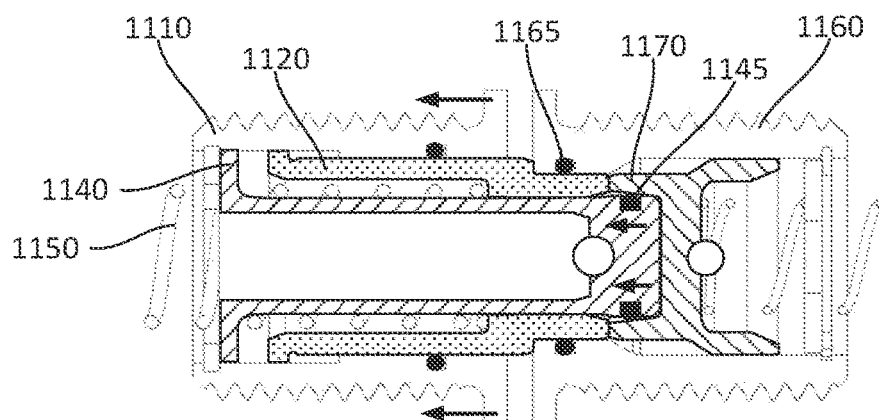

Specifically, FIG. 11A illustrates fluidic coupling 1100 is in the coupled state. FIG. 11B illustrates the first step in this disconnecting operation where first body 1110 is moved away from second body 1160. First spool 1120 is biased by first spring 1150, which pushes first spool 1120 out of first body 1110. At this step, second body 1160 is operable as a positive stop for first spool 1120. In fact, second body 1160 is operable as a positive stop for first spool 1120 during the coupled state in FIG. 11A and the next/second step in FIG. 11C. Referring to FIG. 11B, slider 1140 follows first body 1110 and is retracted into first spool 1120. At this step, the first slider seal 1145 is not contacting/sealed against the first spool 1120 thereby allowing the thermal liquid 902 to flow (through a slider opening) between the cavity inside slider 1140 and the space between slider 1140 and second body 1160. At the same time, as slider 1140 follows first body 1110 and is retracted into first spool 1120, second spool 1170 is biased toward first spool 1120. FIG. 11B illustrates a point where second spool 1170 reaches and contacts first spool 1120. From this point on, first spool 1120 is operable as a positive stop for second spool 1170, at least through the few steps described below. In the coupled state of FIG. 11A, slider 1140 acted as a positive stop for second spool 1170. This spool contact can restrict the flow of thermal liquid 902 (in comparison to the coupled state of FIG. 11A) but does not fully seal the flow.

Figure 11C:
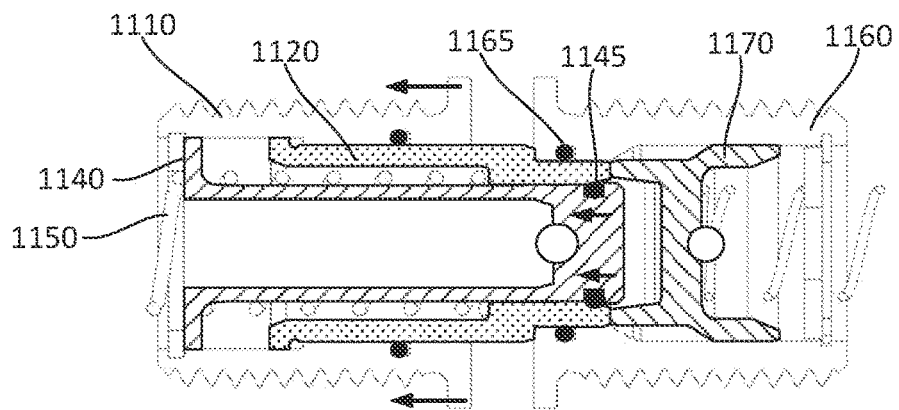

FIG. 11C illustrates the second step in this disconnecting operation where first body 1110 is moved further away from second body 1160 (in comparison to the first step of FIG. 11B). Slider 1140 follows first body 1110 and is retracted into first spool 1120. However, at this step, the first slider seal 1145 is sealed against the first spool 1120 thereby preventing thermal liquid 902 from flowing between the cavity inside slider 1140 and the space between slider 1140 and second body 1160. First spool 1120 continues being pushed out of first body 1110 by first spring 1150 with second body 1160 still operable as a positive stop.

Figure 11D:
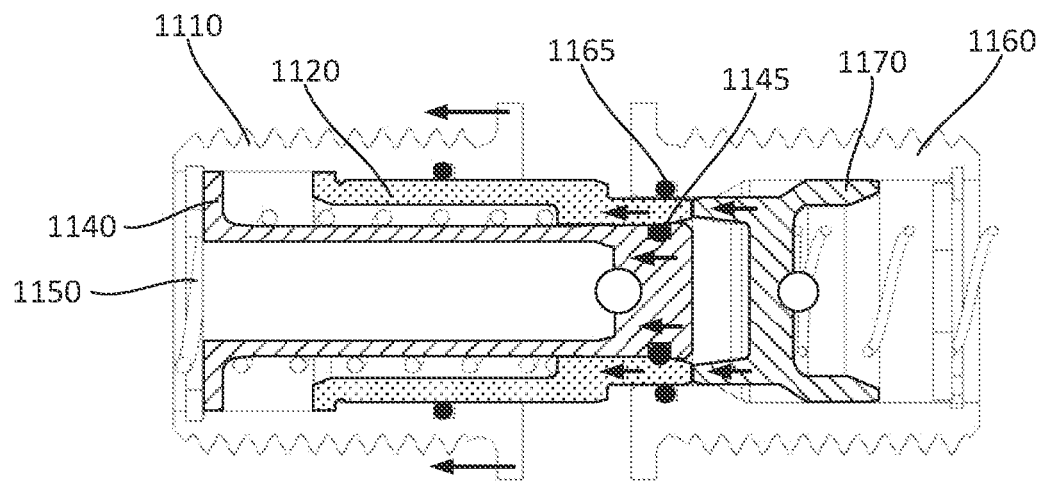

FIG. 11D illustrates the third step in this disconnecting operation where first body 1110 is moved further away from second body 1160 (in comparison to the second step of FIG. 11C). First slider seal 1145 remains sealed against first spool 1120 thereby preventing the flow of thermal liquid 902. First spool 1120 is no longer being pushed out of first body 1110 since a feature of first body 1110 is now operable as a positive stop for first spool 1120. As such, the first spool 1120 is now being extracted from the second body 1160. However, the second seal 1165 still seals against the first spool 1120 at this stage.

Figure 11E:
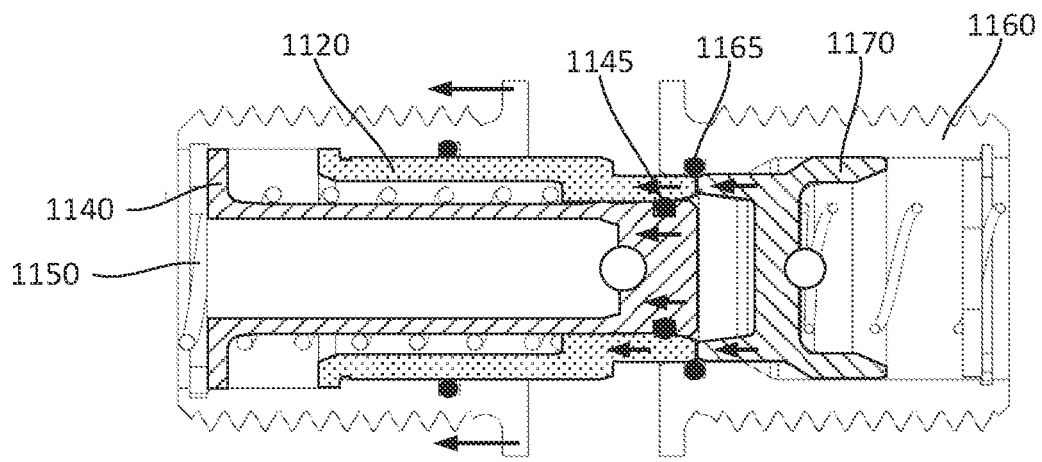

FIG. 11E illustrates the fourth step in this disconnecting operation where first body 1110 is moved further away from second body 1160 (in comparison to the second step of FIG. 11D). First slider seal 1145 remains sealed against first spool 1120 thereby preventing the flow of thermal liquid 902. First spool 1120 continues being extracted from the second body 1160. The specific point (shown in FIG. 11E) can be referred to as the "second seal handoff" where second seal 1165 disengages first spool 1120 and engages second spool 1170, which follows the travel of first spool 1120.

Figure 11F:
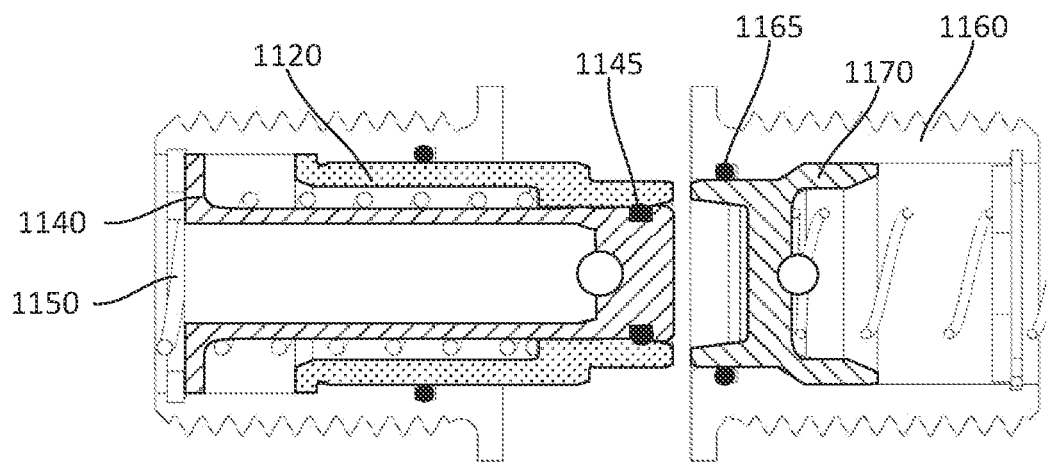

Finally, FIG. 11F illustrates the decoupled state where first body 1110 is moved even further away from second body 1160 (in comparison to the second step of FIG. 11E). This decoupled state is described above with reference to FIG. 11B.

Electric Lawnmower Operating Examples

Figure 12:
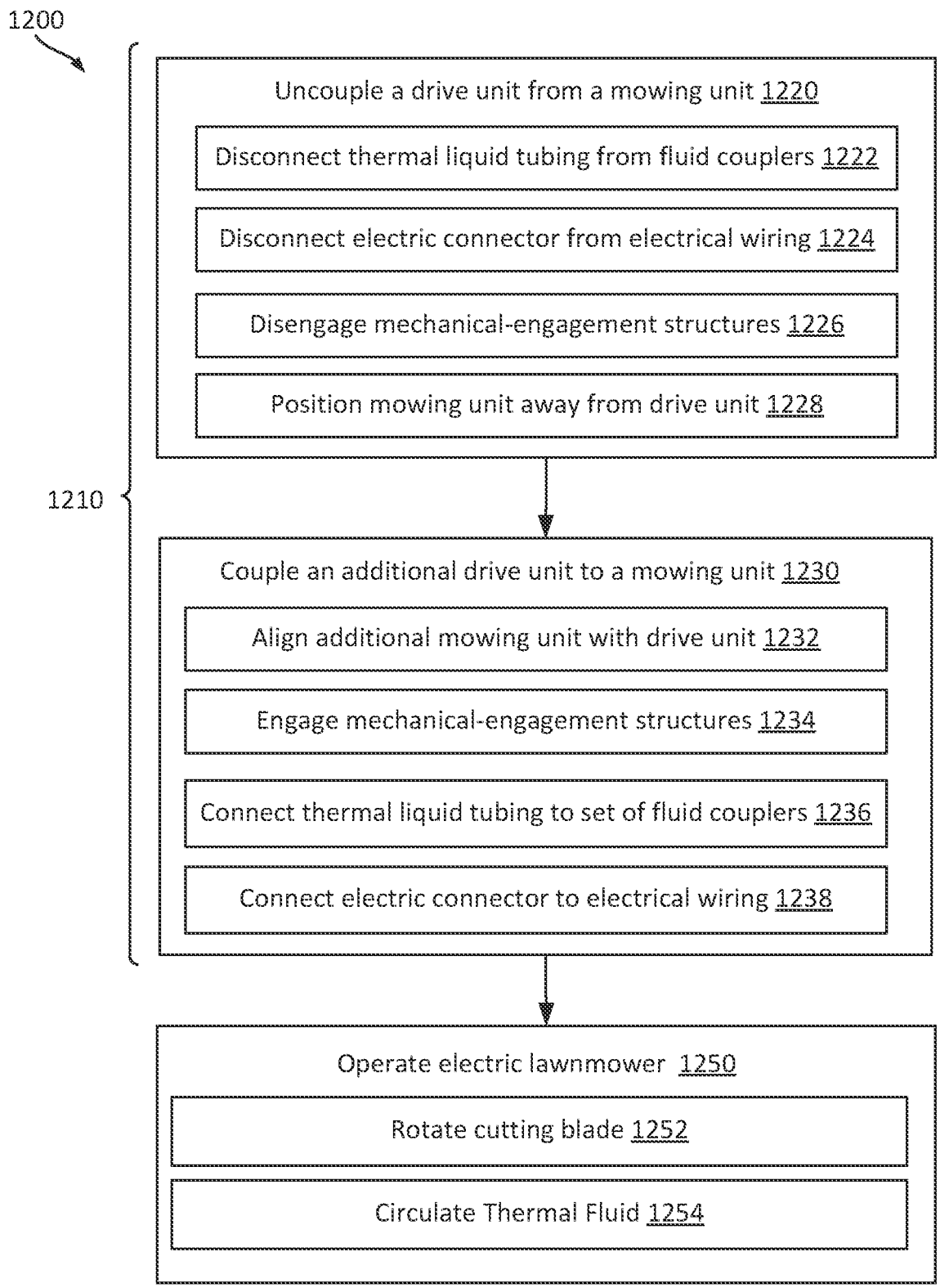
FIG. 12 is a process flowchart of operating an electric lawnmower, in accordance with some examples.

FIG. 12 is a process flowchart corresponding to method 1200 of operating electric lawnmower 100, in accordance with some examples. Method 1200 comprises (block 1210) providing an electric lawnmower 100, various examples of which are described above.

In some examples, this mower-providing operation comprises replacing the mowing unit 110 with the additional mowing unit 150. In these examples, method 1200 comprises (block 1220) uncoupling the mowing unit 110 from the drive unit 102 and (block 1230) coupling the additional mowing unit 150 to the drive unit 102. Specifically, the uncoupling operation comprises (block 1222) disconnecting electric wiring 109 from a mowing-unit electric motor 118, (block 1224) disconnecting a thermal liquid tubing 909 from the set of fluid couplers 111 of the mowing unit 110, and (block 1226) disengaging a set of drive-unit mechanical-engagement structures 107 from a set of mowing-unit mechanical-engagement structures 117 of the mowing unit 110. In some examples, the mechanical disengagement is performed after the fluidic and electric disconnections. The order of the fluidic and electrical disconnections can be any. One example of the fluidic disconnection is presented above with reference to FIGS. 11A-11F. The mechanical disconnection may involve removing the pins (or other engagement features) connecting the set of drive-unit mechanical-engagement structures 107 with the set of mowing-unit mechanical-engagement structures 117. Once the mowing unit 110 is mechanically, fluidically, and electrically disconnected, the uncoupling operation may proceed with (block 1228) positioning the mowing unit 110 away from the electric lawnmower 100.

The coupling operation comprises (block 1232) aligning the additional mowing unit 150 with the electric lawnmower 100, (block 1234) engaging the set of drive-unit mechanical-engagement structures 107 to a set of additional mowing-unit mechanical-engagement structures 157, (block 1236) connecting the thermal liquid tubing 909 to an additional dis-engageable fluidic coupling 151 of the additional mowing unit 150, and (block 1238) connecting the electric wiring 109 to an additional mowing-unit electric motor 158. These fluidic, electric, and mechanical connections can be performed similarly to the disconnection operations described above. However, the mechanical connection can be completed before the fluidic and electric connections thereby preserving the orientation of the drive unit 102 and the additional mowing unit 150 while forming these fluidic and electric connections and to avoid damaging the connected components.

Method 1200 may proceed with (block 1250) operating the electric lawnmower 100 or, more specifically with (block 1252) rotating the cutting blade 170 at a speed of less than 3,000 RPMs, less than 2,500 RPMs, or even less than 2,000 RPMs. As noted above, the turbulence within enclosure tunnel 131 is significantly reduced at these speeds (in comparison to conventional lawnmower operations at about 4,000 RPMs). In some examples, electric lawnmower 100 produces a noise level of less than 70 dB at 10 meters.

In some examples, rotating the cutting blade 170 slices grass extending into enclosure tunnel 131 and carries the sliced grass into discharge conduit 112. For example, cutting edge 172, at a point furthest away from blade center axis 171, can form an approach angle ($\alpha$) of 20°-60°, as described above.

In some examples, method 1200 further comprises (block 1254) circulating the thermal liquid 902 through the fluid passage 139 of the blade enclosures 130 or, more generally, of the mowing-unit enclosure 122. As noted above, the mowing unit 110 may be equipped with the thermal-liquid pump 184, driven by the mowing-unit electric motor 118 of the mowing unit 110. The thermal-liquid pump 184 is used to circulate the thermal liquid 902 through the fluid passage 139 and, in some examples, between the mowing unit 110 and the drive unit 102 (e.g., the drive motor 105 and/or the power electronics unit 103).

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:
1. An electric lawnmower comprising:
a drive unit comprises a battery, a power electronics unit, and a drive motor powered by the battery; and
a mowing unit coupled to the drive unit and comprising a set of cutting blade units, wherein:
each unit in the set of cutting blade units comprises a blade enclosure and a cutting blade at least partially surrounded by the blade enclosure, and
the blade enclosure comprises a fluid passage, fluidically connected to at least one of the battery, the power electronics unit, and the drive motor of the drive unit such that a thermal liquid is able to circulate between the fluid passage of each unit in the set of cutting blade units and the at least one of the battery, the power electronics unit, and the drive motor for cooling the at least one of the battery, the power electronics unit, and the drive motor.

2. The electric lawnmower of claim 1, wherein the fluid passage is a cavity formed within a wall of the blade enclosure.

3. The electric lawnmower of claim 2, wherein:
the blade enclosure of each unit in the set of cutting blade units is monolithically integrated into a mowing-unit enclosure, and
the mowing-unit enclosure is a single-cast unit with the fluid passage formed during casting of the mowing-unit enclosure.

4. The electric lawnmower of claim 3, the mowing-unit enclosure comprises a set of pressure-releasing plug distributed along the fluid passage of the blade enclosure in each unit in the set of cutting blade units and configured to open the fluid passage to environment when a pressure inside the fluid passage exceeds a set threshold.

5. The electric lawnmower of claim 3, wherein the mowing unit comprises a thermal-liquid pump, extending into the fluid passage of the blade enclosure of one unit in the set of cutting blade units and is mechanically coupled to and driven by a mowing-unit electric motor.

6. The electric lawnmower of claim 5, wherein:
the mowing unit comprises a belt coupling the thermal-liquid pump and a shaft of each unit in the set of cutting blade units to the mowing-unit electric motor, and
the shaft is connected to the cutting blade of a corresponding unit in the set of cutting blade units.

7. The electric lawnmower of claim 5, further comprising a temperature controller, configured to receive temperature of at least one of the battery, the power electronics unit, and the drive motor of the drive unit and further configured to operate the mowing-unit electric motor based on the temperature received from at least one of the battery, the power electronics unit, and the drive motor.

8. The electric lawnmower of claim 5, wherein the mowing-unit electric motor is powered by the battery.

9. The electric lawnmower of claim 5, wherein the thermal-liquid pump is configured to pump a thermal liquid through the fluid passage of the blade enclosure of each unit in the set of cutting blade units and though the least one of the battery, the power electronics unit, and the drive motor of the drive unit.

10. The electric lawnmower of claim 9, wherein:
the power electronics unit comprises a heat exchanger comprising a first fluid passage and a second fluid passage that are thermally coupled to each other,
the first fluid passage is fluidically coupled to the fluid passage of the blade enclosure of each unit in the set of cutting blade units and is filled with the thermal liquid, and
the second fluid passage is fluidically coupled with the battery and is filled with an additional thermal liquid, different from the thermal liquid.

11. The electric lawnmower of claim 10, wherein:
the thermal liquid is a water-based liquid, and
the additional thermal liquid is an oil-based liquid.

12. The electric lawnmower of claim 10, wherein:
the battery is an immersion-cooled battery comprising a set of bus bars interconnecting cell terminals, and
the set of bus bars and the cell terminals of the battery are in direct contact with the additional thermal liquid.

13. The electric lawnmower of claim 9, wherein the drive unit comprises an additional thermal liquid pump for pumping the additional thermal liquid between the second fluid passage is fluidically coupled with the battery.

14. The electric lawnmower of claim 1, wherein:
the mowing unit comprises a set of fluid couplers providing dis-engageable fluidic couplings to at least one of the battery and a drive motor of the drive unit, and
the fluid passage is fluidically connected to the set of fluid couplers.

15. The electric lawnmower of claim 14, wherein each coupler in the set of fluid couplers is a no-spill coupler.

16. The electric lawnmower of claim 1, wherein the fluid passage is a pipe connected to an exterior surface of a wall of the blade enclosure.

17. A method of cooling one or more components of an electric lawnmower comprising a drive unit and a mowing unit, the method comprising:
coupling the drive unit to the mowing unit, wherein:
the drive unit comprises a battery, a power electronics unit, and a drive motor powered by the battery,
the mowing unit comprises a set of cutting blade units such that each unit in the set of cutting blade units comprises a blade enclosure and a cutting blade at least partially surrounded by the blade enclosure,
the blade enclosure comprises a fluid passage, which is fluidically connected to at least one of the battery, the power electronics unit, and the drive motor of the drive unit after coupling the drive unit to the mowing unit, and
the mowing unit comprises a thermal-liquid pump, extending into the fluid passage of the blade enclosure of one unit in the set of cutting blade units and is mechanically coupled to a mowing-unit electric motor; and
operating the mowing-unit electric motor thereby causing the cutting blade of each unit in the set of cutting blade units to spin and also causing the thermal-liquid pump to pump a thermal liquid through the fluid passage and between the fluid passage and at least one of the battery, the power electronics unit, and the drive motor of the drive unit.

18. The method of claim 17, wherein coupling the drive unit to the mowing unit comprises connecting a thermal liquid tubing of the drive unit to a set of fluid couplers of the mowing unit thereby forming a fluidic connection between the fluid passage and at least one of the battery, the power electronics unit, and the drive motor.

19. The method of claim 17, wherein coupling the drive unit to the mowing unit comprises electrically connecting the mowing-unit electric motor to the battery.

20. The method of claim 17, wherein:
- the power electronics unit comprises a heat exchanger comprising a first fluid passage and a second fluid passage thermally coupled to each other,
- the first fluid passage is fluidically coupled to the fluid passage of the blade enclosure of each unit in the set of cutting blade units such that the thermal liquid is pumped through the first fluid passage,
- the second fluid passage is fluidically coupled with the battery and is filled with an additional thermal liquid, different from the thermal liquid, and
- the method further comprises pumping the additional thermal liquid between the second fluid passage and the battery.

* * * * *

UNITED STATES PATENT AND TRADEMARK OFFICE
CERTIFICATE OF CORRECTION

| | | |
|---|---|---|
| PATENT NO. | : 11,917,940 B1 | Page 1 of 1 |
| APPLICATION NO. | : 18/474640 | |
| DATED | : March 5, 2024 | |
| INVENTOR(S) | : Ian Wright, David Beard and David Kieke | |

It is certified that error appears in the above-identified patent and that said Letters Patent is hereby corrected as shown below:

On the Title Page

Item (72), please add a third inventor, "David Kieke, Carmine, TX (US)"

Signed and Sealed this
Ninth Day of July, 2024

Katherine Kelly Vidal
*Director of the United States Patent and Trademark Office*